(12) United States Patent
Lee et al.

(10) Patent No.: US 9,740,630 B2
(45) Date of Patent: Aug. 22, 2017

(54) METHOD OF MAPPING ADDRESS IN STORAGE DEVICE, METHOD OF READING DATA FROM STORAGE DEVICES AND METHOD OF WRITING DATA INTO STORAGE DEVICES

(71) Applicant: SAMSUNG ELECTRONICS CO., LTD., Suwon-si, Gyeonggi-do (KR)

(72) Inventors: Hyun-Seob Lee, Ansan-si (KR); Jung-Yeon Yoon, Hwaseong-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 187 days.

(21) Appl. No.: 14/613,011

(22) Filed: Feb. 3, 2015

(65) Prior Publication Data

US 2015/0227313 A1    Aug. 13, 2015

(30) Foreign Application Priority Data

Feb. 11, 2014   (KR) .................. 10-2014-0015429

(51) Int. Cl.
- *G06F 3/06* (2006.01)
- *G06F 12/00* (2006.01)
- *G06F 12/1009* (2016.01)

(52) U.S. Cl.
CPC .. *G06F 12/1009* (2013.01); *G06F 2003/0691* (2013.01)

(58) Field of Classification Search
CPC .. G06F 12/00; G06F 12/0238; G06F 12/0246; G06F 3/0679; G06F 3/061; G06F 3/0656

USPC ......................... 711/100, 103, 154
See application file for complete search history.

(56) References Cited

U.S. PATENT DOCUMENTS

| | | | |
|---|---|---|---|
| 5,586,291 A * | 12/1996 | Lasker | G06F 11/1435 711/113 |
| 7,193,923 B2 | 3/2007 | Nishihara et al. | |
| 7,802,054 B2 | 9/2010 | Park et al. | |
| 8,010,736 B2 | 8/2011 | Park et al. | |
| 8,060,719 B2 | 11/2011 | Radke et al. | |
| 8,171,208 B2 | 5/2012 | Yano et al. | |

(Continued)

FOREIGN PATENT DOCUMENTS

| | | |
|---|---|---|
| KR | 1020090098276 A | 9/2009 |
| KR | 1061483 B | 9/2011 |
| KR | 101297442 B1 | 8/2013 |

*Primary Examiner* — Tuan Thai
(74) *Attorney, Agent, or Firm* — Volentine & Whitt, PLLC

(57) ABSTRACT

In a method of mapping an address in a storage device, first address mapping information including a first physical address and a first logical address is registered in an address mapping table. The first physical address corresponds to a first storage area in the storage device. The first storage area includes a first type of memory. The first logical address corresponds to the first physical address. Second address mapping information including a second physical address and a second logical address is registered in the address mapping table. The second physical address corresponds to a second storage area in the storage device. The second storage area includes a second type of memory that is different from the first type of memory. The second logical address corresponds to the second physical address.

20 Claims, 19 Drawing Sheets

(56) References Cited

U.S. PATENT DOCUMENTS

| | | | |
|---|---|---|---|
| 8,234,466 B2* | 7/2012 | Yeh | G06F 12/0804 |
| | | | 711/162 |
| 8,355,280 B2* | 1/2013 | Yoon | G11C 11/56 |
| | | | 365/185.03 |
| 8,626,996 B2 | 1/2014 | Oh et al. | |
| 2008/0147888 A1* | 6/2008 | Giles | G06F 12/06 |
| | | | 710/3 |
| 2008/0189490 A1 | 8/2008 | Cheon et al. | |
| 2008/0195801 A1 | 8/2008 | Cheon et al. | |
| 2011/0072198 A1 | 3/2011 | Reiter et al. | |
| 2012/0054421 A1* | 3/2012 | Hiratsuka | G06F 12/0246 |
| | | | 711/103 |
| 2012/0284587 A1 | 11/2012 | Yu et al. | |
| 2013/0124794 A1 | 5/2013 | Bux et al. | |
| 2014/0101469 A1 | 4/2014 | Fang et al. | |
| 2014/0146870 A1 | 5/2014 | Liu et al. | |

* cited by examiner

METHOD OF MAPPING ADDRESS IN STORAGE DEVICE, METHOD OF READING DATA FROM STORAGE DEVICES AND METHOD OF WRITING DATA INTO STORAGE DEVICES

CROSS-REFERENCE TO RELATED APPLICATIONS

A claim of priority under 35 USC §119 is made to Korean Patent Application No. 2014-0015429, filed on Feb. 11, 2014, the entire contents of which are hereby incorporated by reference.

BACKGROUND

The present inventive concept herein relates generally to storage devices, and more particularly to methods of mapping addresses in storage devices, methods of reading data from storage devices and methods of writing data into storage devices.

Data storage devices may typically be configured from one or more semiconductor memory devices. Solid state drives (SSD) and memory cards (MC) are example types of data storage devices configured from one or more semiconductor memory devices. Data storage devices such as SSDs and MCs enjoy a number of design and performance advantages over conventional hard disk drives (HDD), including absence of moving mechanical parts, higher data access speeds, improved stability and durability, low power consumption, and so on. Data storage devices usually include both nonvolatile and volatile memories. The nonvolatile memory is typically used as the primary data storage medium, while the volatile memory is typically used as data input and/or output (I/O) buffer memory (or "cache") between the nonvolatile memory and a controller or an interface. Use of such buffer memory improves overall data access speed within the data storage device.

SUMMARY

Embodiments of the inventive concept are provided to substantially obviate one or more problems due to limitations and disadvantages of the related art.

Some example embodiments of the inventive concept provide a method of effectively mapping addresses in a storage device. Other example embodiments of the inventive concept provide a method of effectively reading data from a storage device based on the method of mapping the addresses in the storage device. Still other example embodiments of the inventive concept provide a method of effectively writing data into a storage device based on the method of mapping the addresses in the storage device.

According to example embodiments of the inventive concept, in a method of mapping addresses in a storage device, first address mapping information including a first physical address and a first logical address is registered in an address mapping table. The first physical address may correspond to a first storage area in the storage device. The first storage area may include a first type of memory. The first logical address corresponds to the first physical address. Second address mapping information including a second physical address and a second logical address is registered in the address mapping table. The second physical address may correspond to a second storage area in the storage device. The second storage area may include a second type of memory that is different from the first type of memory. The second logical address corresponds to the second physical address.

In an example embodiment of the inventive concept, the first physical address may include a first flag bit, and the second physical address may include a second flag bit. The first flag bit in the first physical address may be different from the second flag bit in the second physical address.

The first flag bit in the first physical address may correspond to a most significant bit (MSB) of the first physical address.

In an example embodiment of the inventive concept, the first physical address may be within a first range, and the second physical address may be within a second range that is different from the first range.

The first range and the second range may be a consecutive range of addresses.

In an example embodiment of the inventive concept, the first storage area may include at least one volatile memory, and the second storage area may include at least one nonvolatile memory.

The storage device may include a battery. The battery may supply power to the storage device even if external power is shut off.

In an example embodiment of the inventive concept, the first storage area may operate as a buffer that temporarily stores data, and the second storage area may operate as a storage media that stores the data.

In an example embodiment of the inventive concept, the first storage area may store hot data whereby a frequency of access to the hot data is higher than or equal to a reference frequency, and the second storage area may store cold data whereby a frequency of access to the cold data is lower than the reference frequency.

The hot data may include at least one of meta data, a file allocation table (FAT) and a directory entry (DE).

In the method of mapping the address in the storage device, third address mapping information including a third physical address and a third logical address may be further registered in the address mapping table. The third physical address may correspond to a third storage area in the storage device. The third storage area may include a third type of memory that is different from the first and second types of memories. The third logical address may correspond to the third physical address.

The storage device may include a controller. The controller may receive a command from an external host and may control an operation of the storage device based on the command.

The address mapping table may be stored in at least one of the first storage area and the second storage area. The address mapping table may be used in the storage device by loading the address mapping table on the controller.

According to example embodiments of the inventive concept, in a method of reading data from a storage device, a read command and a read address are received from an external host. A determination is made whether first data is stored in a first storage area or a second storage area based on an address mapping table and the read address, and a determination result is generated. The address mapping table may include address mapping information associated with the first storage area and the second storage area in the storage device. The first storage area may include a first type of memory. The second storage area may include a second type of memory that is different from the first type of memory. The first data is read from one of the first storage area and the second storage area based on the determination result.

In determining whether the first data is stored in the first storage area or the second storage area, a first physical address corresponding to the read address may be obtained based on the address mapping table. When a first flag bit included in the first physical address has a first value, it may be determined that the first data is stored in the first storage area. When the first flag bit has a second value that is different from the first value, it may be determined that the first data is stored in the second storage area.

In determining whether the first data is stored in the first storage area or the second storage area, a first physical address corresponding to the read address may be obtained based on the address mapping table. When the first physical address is within a first range, it may be determined that the first data is stored in the first storage area. When the first physical address is within a second range that is different from the first range, it may be determined that the first data is stored in the second storage area.

The storage device may be one of a memory card (MC) and a solid state drive (SSD).

According to example embodiments of the inventive concept, in a method of writing data into a storage device, a write command, a write address and first data are received from an external host. The first data is written into one of a first storage area and a second storage area in the storage device based on the write address. The first storage area may include a first type of memory. The second storage area may include a second type of memory that is different from the first type of memory. First address mapping information including a first physical address and the write address is registered in an address mapping table. The first physical address corresponds to a region in which the first data is stored. The write address corresponds to the first physical address.

In registering the first address mapping information in the address mapping table, when the first data is written into the first storage area, the first physical address corresponding to the first storage area may be obtained to set a first flag bit included in the first physical address as a first value. When the first data is written into the second storage area, the first physical address corresponding to the second storage area may be obtained to set the first flag bit as a second value that is different from the first value. The address mapping table may be updated by matching the first physical address and the write address.

In registering the first address mapping information in the address mapping table, when the first data is written into the first storage area, the first physical address corresponding to the first storage area and within a first range may be obtained. When the first data is written into the second storage area, the first physical address corresponding to the second storage area and within a second range that is different from the first range may be obtained. The address mapping table may be updated by matching the first physical address and the write address.

Accordingly, in the method of mapping the addresses in the storage device according to example embodiments of the inventive concept, address mapping information associated with different types of memories in the storage device may be registered in a single address mapping table, and addresses for accessing the different types of memories may be synthetically mapped in the single address mapping table. The data read and write operations may be performed based on the single address mapping table. Thus, overhead and latencies required to access the storage device may be reduced, and the storage device may have relatively improved performance.

BRIEF DESCRIPTION OF THE DRAWINGS

Illustrative, non-limiting example embodiments of the inventive concept will be more clearly understood from the following detailed description taken in conjunction with the accompanying drawings.

DETAILED DESCRIPTION

Figure 1:
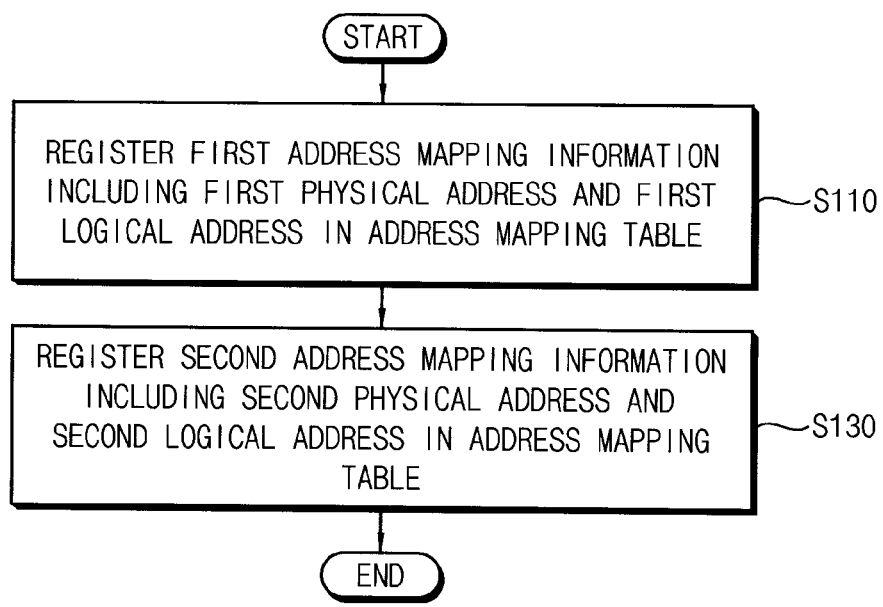
FIG. 1 is a flow chart illustrating a method of mapping addresses in a storage device according to example embodiments of the inventive concept.

Various example embodiments of the inventive concept will be described more fully with reference to the accompanying drawings, in which embodiments are shown. The the inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of mapping addresses in a storage device according to example embodiments of the inventive concept.

The method of FIG. 1 may be applied for driving a storage device that includes at least two storage areas. The at least two storage areas may include different types of memories. Detailed configurations of the storage device will be described below with reference to FIGS. 2A and 2B.

Referring to FIG. 1, in the method of mapping the address in the storage device according to example embodiments of the inventive concept, first address mapping information is registered in an address mapping table (step S110), and second address mapping information is registered in the address mapping table (step S130). The storage device includes a first storage area and a second storage area. The first address mapping information includes a first physical address and a first logical address. The first physical address corresponds to the first storage area including a first type of memory. The first logical address corresponds to the first physical address. The second address mapping information includes a second physical address and a second logical address. The second physical address corresponds to the second storage area including a second type of memory, which is different from the first type of memory. The second logical address corresponds to the second physical address.

As described above, the first and second storage areas may include different types of memories. In some example embodiments, the first storage area may include at least one volatile memory, and the second storage area may include at least one nonvolatile memory. In other example embodiments, the first storage area may include a first memory having a relatively high operation speed (e.g., a relatively high data access speed), and the second storage area may include a second memory having a relatively low operation speed (e.g., a relatively low data access speed).

Figure 17:
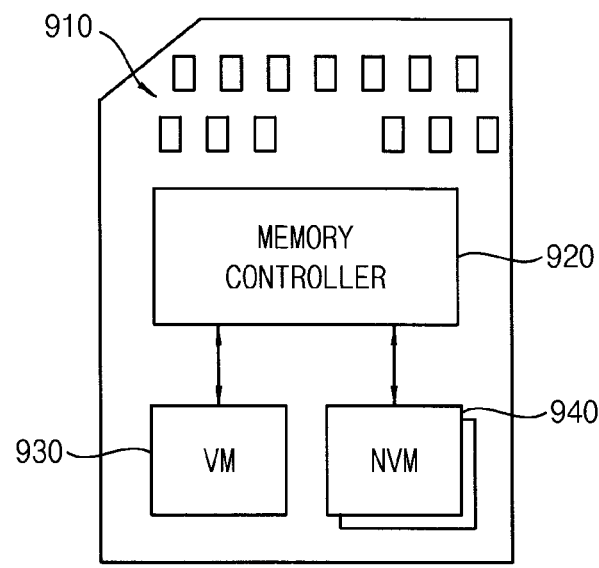
FIG. 17 is a diagram illustrating a memory card (MC) according to example embodiments of the inventive concept.
Figure 18:
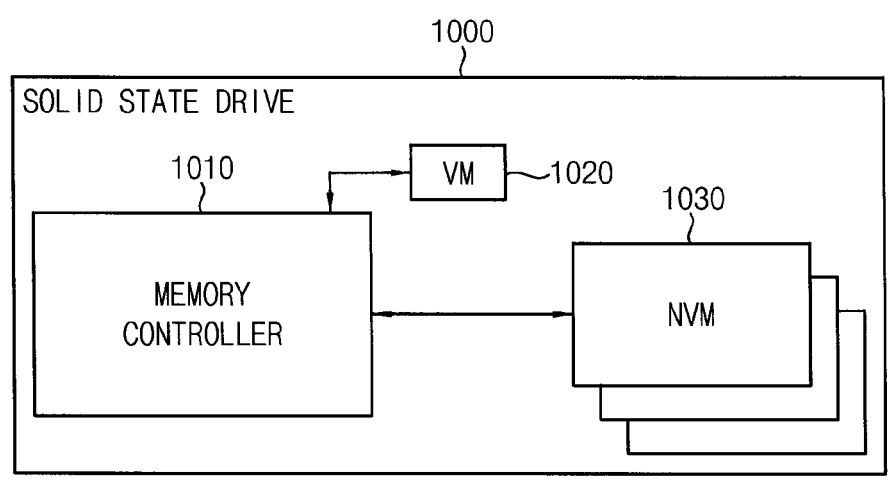
FIG. 18 is a diagram illustrating a solid state drive (SSD) according to example embodiments of the inventive concept.

In some example embodiments of the inventive concept, the storage device may be any storage device, such as a memory card (MC) illustrated in FIG. 17, a solid state drive (SSD) illustrated in FIG. 18, and so on. For example, the memory card may include a multimedia card (MMC), an embedded multimedia card (eMMC), a hybrid embedded multimedia card (hybrid eMMC), a secure digital (SD) card, a micro-SD card, a memory stick, an identification (ID) card, a personal computer memory card international association (PCMCIA) card, a chip card, a universal serial bus (USB) card, a smart card, a compact flash (CF) card, etc. The solid state drive may include a solid state drive for a personal computer (PC), a solid state drive for a server system, a solid state drive for an enterprise system, and so on.

In the method of mapping the addresses in the storage device according to example embodiments of the inventive concept, the address mapping information associated with the first and second storage areas in the storage device may be registered in a single address mapping table, and addresses for accessing the first and second storage areas in the storage device may be synthetically mapped in the single address mapping table. Accordingly, in the storage device using the method of FIG. 1, overhead and latencies required to access the storage device may be reduced, and the storage device may have relatively improved performance.

According to example embodiments of the inventive concept, the storage device may further include a third storage area. In this case, as will be described below with reference to FIG. 9, address mapping information associated with the first, second and third storage areas in the storage device may be registered in a single address mapping table, and addresses for accessing the first, second and third storage areas in the storage device may be synthetically mapped in the single address mapping table.

Figure 2A:
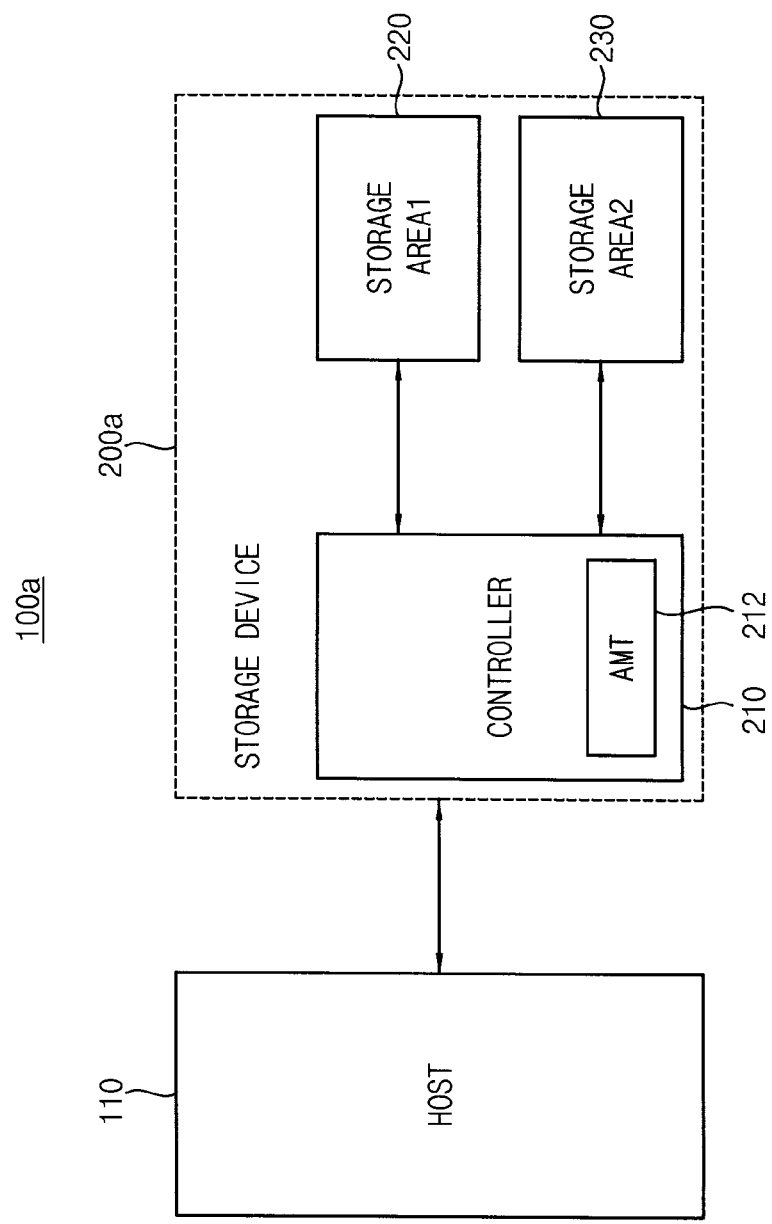
FIGS. 2A and 2B are block diagrams illustrating examples of a computing system including the storage device according to example embodiments of the inventive concept.
Figure 2B:
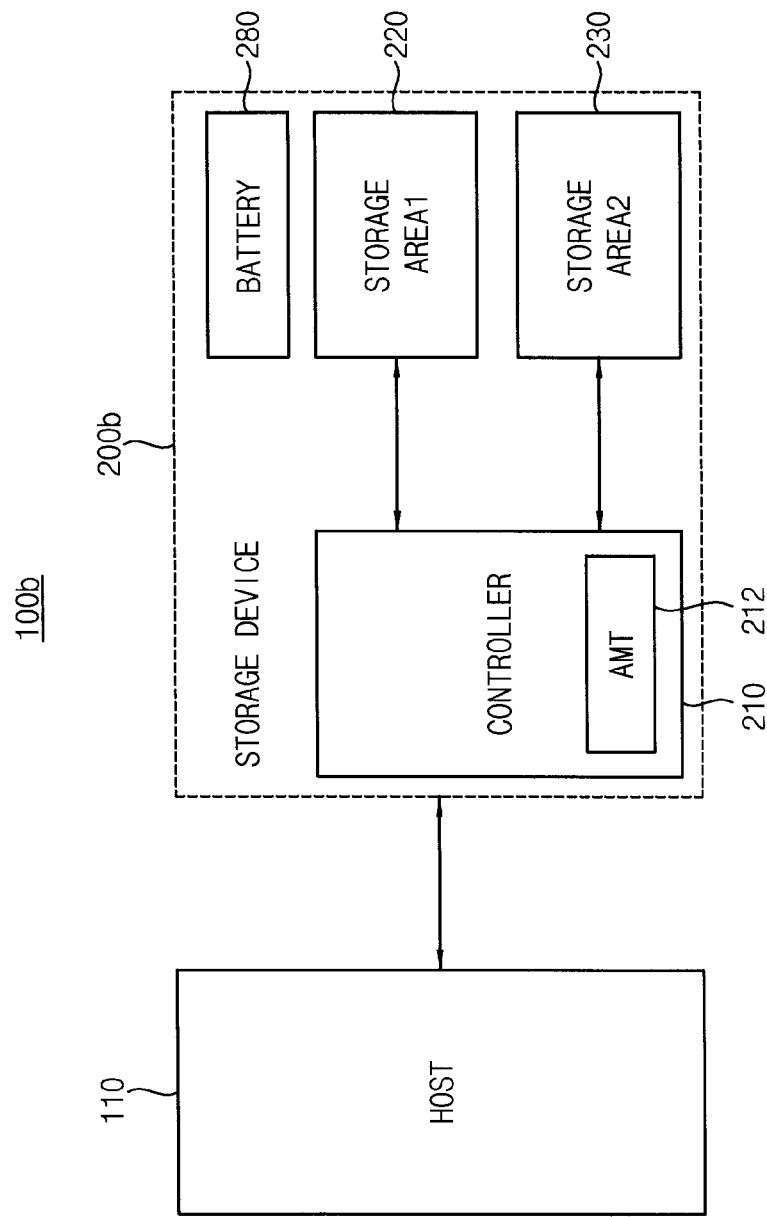

FIGS. 2A and 2B are block diagrams illustrating examples of a computing system including the storage device according to example embodiments of the inventive concept.

Referring to FIG. 2A, a computing system 100a includes a host 110 and a storage device 200a.

The host 110 may perform various computing functions, such as executing specific software for performing specific calculations or tasks. The host 110 may execute an operating system (OS) and/or applications. Although not illustrated in FIG. 2A, the host 110 may include a processor, a main memory and a bus.

In some example embodiments, the host 110 may be configured to communicate with the storage device 200a using at least one of various interface protocols, such as USB, MMC, peripheral component interconnect-express (PCI-E), small computer system interface (SCSI), serial-attached SCSI (SAS), serial advanced technology attachment (SATA), parallel advanced technology attachment (PATA), enhanced small disk interface (ESDI), integrated drive electronics (IDE), and so on.

The storage device 200a may include a controller 210, a first storage area 220 and a second storage area 230.

The controller 210 may receive a command from the host 110, and may control an operation of the storage device 200a based on the command. For example, write data may be stored in at least one of the first and second storage areas 220 and 230, and/or read data may be output from the at least one of the first and second storage areas 220 and 230 based on a request from the host 110 and an operation of the controller 210. In addition, the controller 210 may control internal operations, e.g., performance controlling, data merging, wear leveling and garbage collection, which are required for the characteristics of the storage device 200a and/or for efficient management of the storage device 200a. Although not illustrated in FIG. 2A, the controller 210 may include a processor, a host interface, a memory interface, an error correction code (ECC) block and a bus.

The first and second storage areas 220 and 230 may store the write data based on the operation of the controller 210. The first and second storage areas 220 and 230 may include different types of memories. For example, the first storage area 220 may include a first type of memory, and the second storage area 230 may include a second type of memory that is different from the first type of memory.

In some example embodiments, the first storage area 220 may include at least one volatile memory, such as a dynamic random access memory (DRAM), a static random access memory (SRAM), and so on. The second storage area 230 may include at least one nonvolatile memory, such as a flash memory, and so on.

In other example embodiments, the first storage area 220 may include a first nonvolatile memory having a relatively high operation speed, such as a phase random access memory (PRAM), a ferroelectric random access memory (FRAM), a resistive random access memory (RRAM), a magnetic random access memory (MRAM), and so on. The second storage area 230 may include a second nonvolatile memory having a relatively low operation speed, such as a flash memory, and so on.

As described above, since the first and second storage areas 220 and 230 include the different types of memories, the first and second storage areas 220 and 230 may be used for different purposes. In some example embodiments, the first storage area 220 may operate as a buffer that temporarily stores data, and the second storage area 230 may operate as a storage media that stores data. In other example embodiments, the first storage area 220 may store hot data and the second storage area 230 may store cold data. A frequency of access to the hot data is higher than or equal to a reference frequency, and a frequency of access to the cold data is lower than the reference frequency. In other words, the first storage area 220 may store data that are relatively highly accessed or are relatively frequently updated, and the second storage area 230 may store data that are relatively lowly accessed or are relatively infrequently updated. The hot data may be referred to as dynamic data, and the cold data may be referred to as static data.

The controller 210 may drive firmware and/or software to control operations of the first and second storage areas 220 and 230. To perform the method of mapping the address according to example embodiments, the controller 210 may include an address mapping table 212. The address mapping table 212 may include both address mapping information associated with the first storage area 220 and address mapping information associated with the second storage area 230.

Although FIG. 2A illustrates that the address mapping table 212 is included in the controller 210, the address mapping table may be stored in the at least one of the first and second storage areas 220 and 230. In this case, the address mapping table 212 may be used in the storage device 200a by loading the address mapping table 212 on the controller 210.

According to example embodiments, the storage device 200a may perform one of a page mapping method, a block mapping method and a hybrid mapping method. A page mapping table may be used in the page mapping method. The page mapping table may be used for performing a mapping operation by unit of page, and the page mapping table may store logical pages and corresponding physical pages. A block mapping table may be used in the block mapping method. The block mapping table may be used for performing a mapping operation by unit of block, and the block mapping table may store logical blocks and corresponding physical blocks. The hybrid mapping method may use the page mapping method and the block mapping method simultaneously or in conjunction with one another.

Referring to FIG. 2B, a computing system 100b includes a host 110 and a storage device 200b.

The computing system 100b of FIG. 2B may be substantially the same as the computing system 100a of FIG. 2A, except that the storage device 200b may further include a battery 280. In other words, the host 110, the controller 210, a address mapping table 212, a first storage area 220 and a second storage area 230 in FIG. 2B may be substantially the same as the host 110, the controller 210, the address mapping table 212, the first storage area 220 and the second storage area 230 in FIG. 2A, respectively.

The battery 280 may supply power (e.g., a power supply voltage) to the storage device 200b. Particularly, the battery 280 may supply the power to the storage device 200b even if external power is shut off. If a storage device includes a volatile memory, data stored in the volatile memory may be lost when the external power is suddenly shut off, and thus sudden power-off recovery (SPOR) issues may be caused. Since the storage device 200b in FIG. 2B includes the battery 280, the SPOR issues may not be caused in the storage device 200b even if the external power is suddenly shut off. In the storage device 200b including the volatile memory, the data may not be lost even if the volatile memory is used as a buffer and/or a write cache.

Although FIGS. 2A and 2B illustrate that each of the storage devices 200a and 200b include two storage areas 220 and 230 that include different types of memories, the storage device according to example embodiments of the inventive concept may include more than three storage areas that include different types of memories.

FIGS. 3, 4, 5, 6, 7 and 8 are diagrams descriptive of the method of mapping addresses shown in FIG. 1.

For convenience of illustration, only an address mapping table, a first storage area and a second storage area are illustrated in each of FIGS. 3, 4, 5, 6, 7 and 8. The method of FIG. 1 will be described below with reference to FIGS. 3, 4, 5, 6, 7 and 8, based on the page mapping method.

Figure 3:
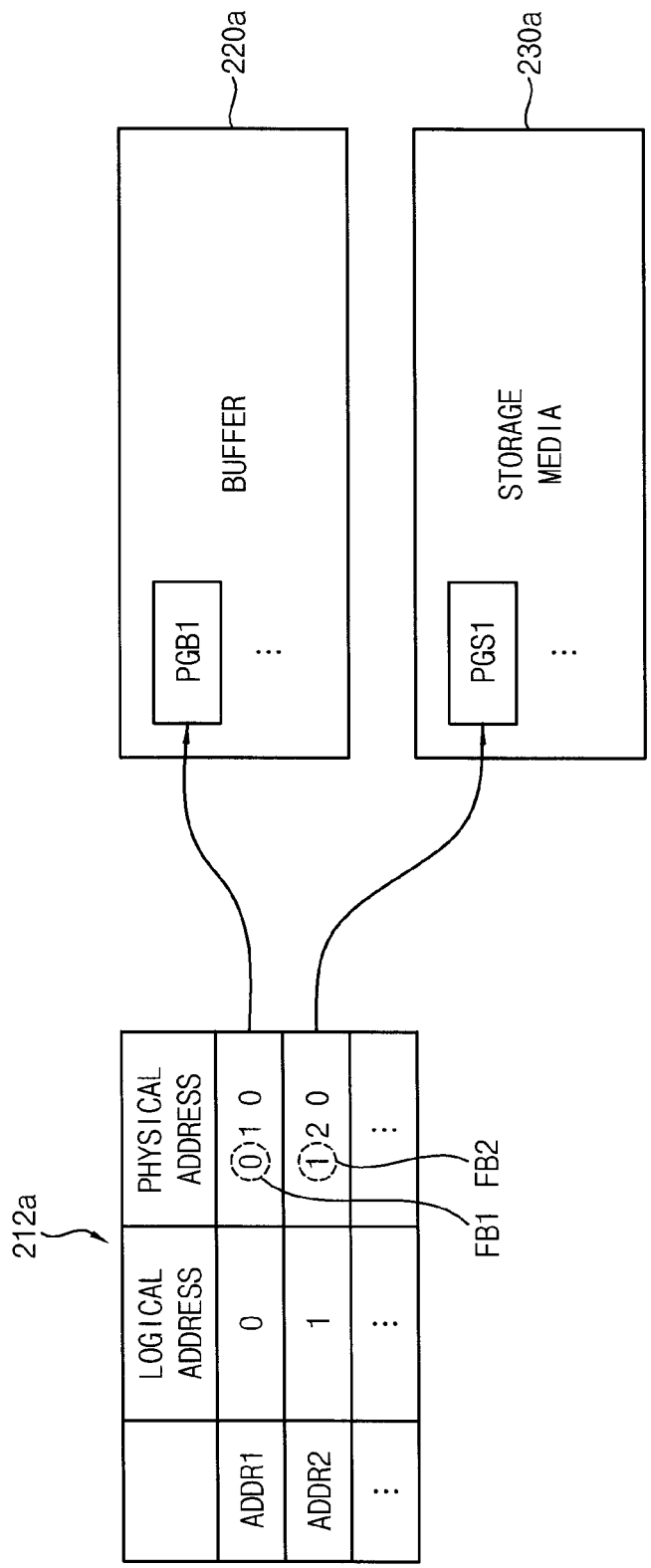
FIGS. 3, 4, 5, 6, 7 and 8 are diagrams descriptive of the method of mapping addresses shown in FIG. 1.

Referring to FIG. 3, a first storage area 220a may operate as a buffer that temporarily stores data. A second storage area 230a may operate as a storage media that stores data. In this case, a first memory included in the first storage area 220a may have an operation speed that is faster than an operation speed of a second memory included in the second storage area 230a. The first storage area 220a may include a plurality of pages having a first page PGB1, and the second storage area 230a may include a plurality of pages having a second page PGS1.

Address mapping information that includes a plurality of logical addresses and a plurality of physical addresses may be included in an address mapping table 212a. For example, the address mapping table 212a may include first address mapping information and second address mapping information. The first address mapping information may include a first logical address "0" corresponding to a first address ADDR1 and a first physical address "010" corresponding to the first logical address "0." The second address mapping information may include a second logical address "1" corresponding to a second address ADDR2 and a second physical address "120" corresponding to the second logical address "1." The first physical address "010" may correspond to the first storage area 220a, and the second physical address "120" may correspond to the second storage area 230a. For example, the first physical address "010" may correspond to the first page PGB1 in the first storage area 220a, and the second physical address "120" may correspond to the second page PGS1 in the second storage area 230a.

Although not illustrated in FIG. 3, the address mapping table 212a may further include address mapping information associated with other pages in the first storage area 220a and address mapping information associated with other pages in the second storage area 230a.

Each of the first physical address "010" and the second physical address "120" may include a flag bit for identifying the storage areas. For example, the first physical address "010" may include a first flag bit FB1, and the second physical address "120" may include a second flag bit FB2. The first flag bit FB1 may be a most significant bit (MSB) of the first physical address "010," and the second flag bit FB2 may be an MSB of the second physical address "120."

Since the first physical address "010" and the second physical address "120" are designated to different storage areas, the first flag bit FB1 in the first physical address "010" may be different from the second flag bit FB2 in the second physical address "120." For example, the first flag bit FB1 may have a first value (e.g., "0") that identifies the first storage area 220a, and the second flag bit FB2 may have a second value (e.g., "1") that is different from the first value and identifies the second storage area 230a.

In the method of mapping the address in the storage device described based on FIG. 3, the first and second storage areas 220a and 230a may be identified based on the flag bit in the physical address. As will be described below with reference to FIGS. 11 and 12, when a data read operation is performed, it may be determined whether read data is stored in the first storage area or the second storage area based on a flag bit corresponding to a read address, and then the read data may be output based on the determination result. As will be described below with reference to FIGS. 14 and 15, when a data write operation is performed, a flag bit in a physical address may be set based on whether write data is stored in the first storage area or the second storage area, and then the address mapping table may be updated by registering a write address and the physical address corresponding to the write address.

Although FIG. 3 illustrates that the flag bit is the MSB of the physical address, the flag bit may be a least significant bit (LSB) of the physical address or any one bit of the physical address according to example embodiments. In addition, although FIG. 3 illustrates that the flag bit is included in the physical address, the flag bit may be included in the logical address according to example embodiments.

Figure 4:
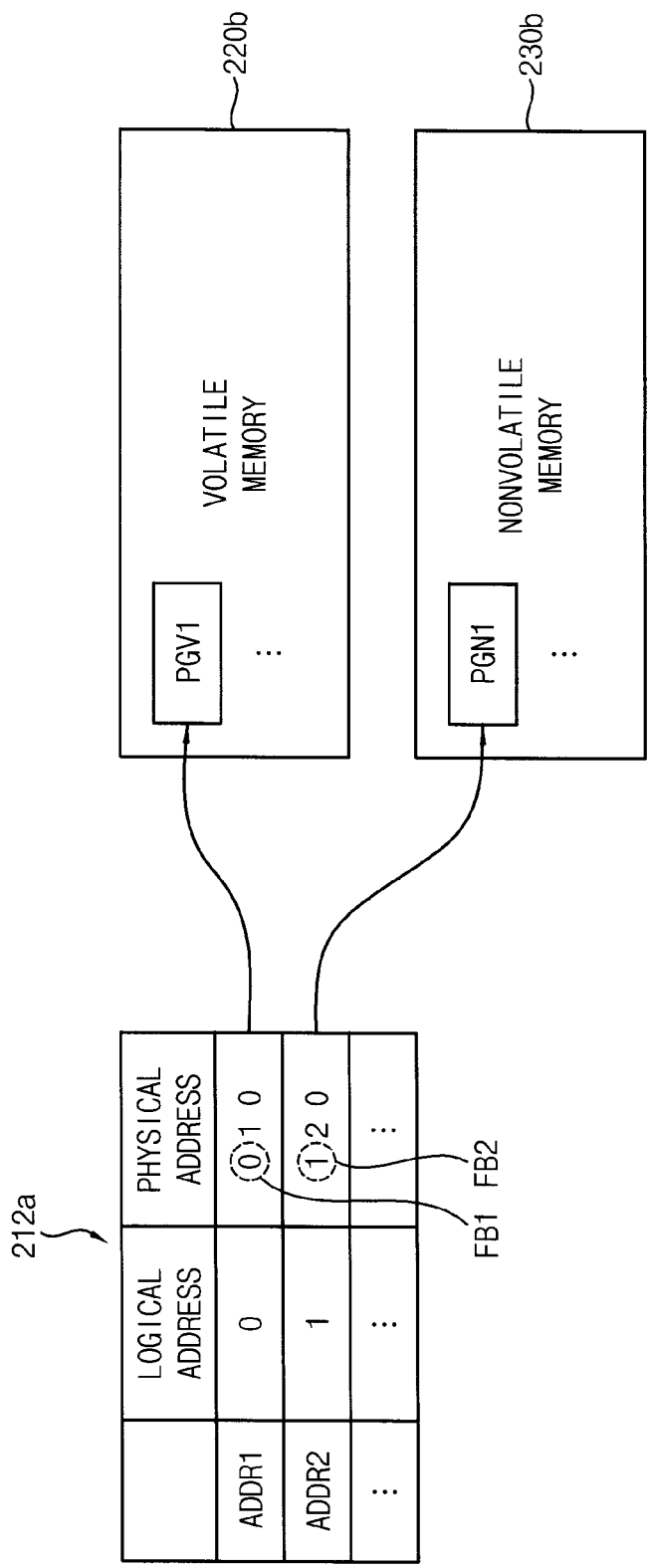

Referring to FIG. 4, a first storage area 220b may include at least one volatile memory such as a DRAM, an SRAM, etc. A second storage area 230b may include at least one nonvolatile memory such as a flash memory. The first storage area 220b may include a plurality of pages having a first page PGV1, and the second storage area 230b may include a plurality of pages having a second page PGN1.

In some example embodiments, the second storage area 230b may include NAND flash memories or NOR flash memories. In some example embodiments, memory cells of the flash memories included in the second storage area 230b may be arranged in a two dimensional array structure or a three dimensional vertical array structure. In some example embodiments, the memory cells of the flash memories included in the second storage area 230b may be single-level memory cells (SLCs) in which only one bit is stored in each of the memory cells or multi-level memory cells (MLCs) in which more than two bits are stored in each of the memory cells.

An address mapping table 212a in FIG. 4 may be substantially the same as the address mapping table 212a in FIG. 3. In other words, the address mapping table 212a in FIG. 4 may include first address mapping information and second address mapping information. The first address mapping information may include a first logical address "0" corresponding to a first address ADDR1 and a first physical address "010" corresponding to the first logical address "0." The second address mapping information may include a second logical address "1" corresponding to a second address ADDR2 and a second physical address "120" corresponding to the second logical address "1." The first physical address "010" may correspond to the first page PGV1 in the first storage area 220b, and the second physical address "120" may correspond to the second page PGN1 in the second storage area 230b.

The first physical address "010" may include a first flag bit FB1 that has a first value (e.g., "0") and identifies the first storage area 220b, and the second physical address "120" may include a second flag bit FB2 that has a second value (e.g., "1") and identifies the second storage area 230b.

In the method of mapping the address in the storage device described based on FIG. 4, the first and second storage areas 220b and 230b may be identified based on the flag bit in the physical address. In addition, a data read operation and/or a data write operation may be performed based on the flag bit and the address mapping table.

If the storage device includes a volatile memory (e.g., 220b in FIG. 4), the storage device may further include a battery, as illustrated in FIG. 2B. In this case, the SPOR issues may not be caused in the storage device, and data in the volatile memory may not be lost even if external power is shut off.

Figure 5:
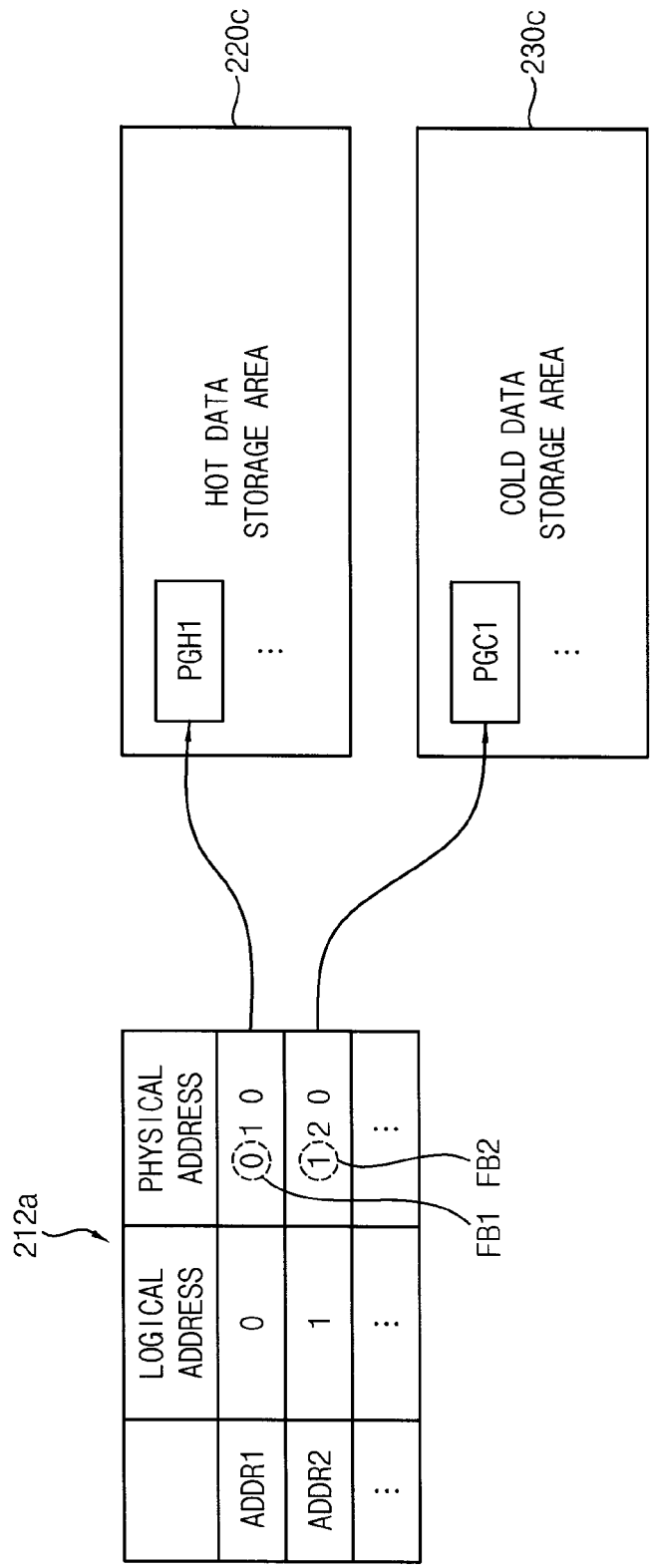

Referring to FIG. 5, a first storage area 220c may store hot data, and a second storage area 230c may store cold data. A frequency of access to the hot data is higher than or equal to a reference frequency, and a frequency of access to the cold data is lower than the reference frequency. The first storage area 220c may include a plurality of pages having a first page PGH1, and the second storage area 230c may include a plurality of pages having a second page PGC1.

In some example embodiments, the hot data may include at least one of meta data, a file allocation table (FAT) and a directory entry (DE). In other example embodiments, the hot data may further include a user hot data (UHD) that is set by a user.

An address mapping table 212a in FIG. 5 may be substantially the same as the address mapping table 212a in FIG. 3. In other words, the address mapping table 212a in FIG. 5 may include first address mapping information and second address mapping information. The first address mapping information may include a first logical address "0" corresponding to a first address ADDR1 and a first physical address "010" corresponding to the first logical address "0." The second address mapping information may include a second logical address "1" corresponding to a second address ADDR2 and a second physical address "120" corresponding to the second logical address "1." The first physical address "010" may correspond to the first page PGH1 in the first storage area 220c, and the second physical address "120" may correspond to the second page PGC1 in the second storage area 230c.

The first physical address "010" may include a first flag bit FB1 that has a first value (e.g., "0") and identifies the first storage area 220c, and the second physical address "120" may include a second flag bit FB2 that has a second value (e.g., "1") and identifies the second storage area 230c.

In the method of mapping the address in the storage device described based on FIG. 5, the first and second storage areas 220c and 230c may be identified based on the flag bit in the physical address. In addition, a data read operation and/or a data write operation may be performed based on the flag bit and the address mapping table.

Figure 6:
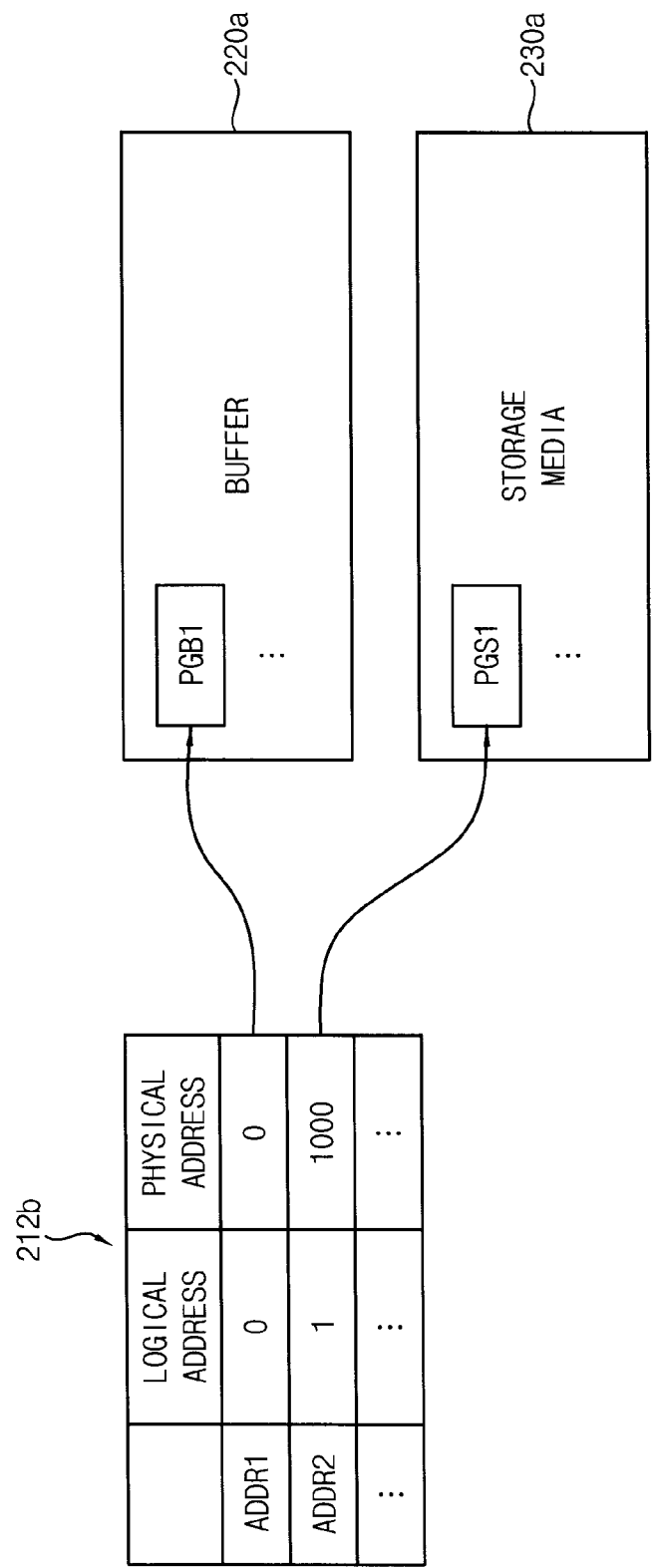

Referring to FIG. 6, a first storage area 220a and a second storage area 230a in FIG. 6 may be substantially the same as the first storage area 220a and the second storage area 230a in FIG. 3, respectively.

An address mapping information that includes a plurality of logical addresses and a plurality of physical addresses may be included in an address mapping table 212b. For example, the address mapping table 212b may include first address mapping information and second address mapping information. The first address mapping information may include a first logical address "0" corresponding to a first address ADDR1 and a first physical address "0" corresponding to the first logical address "0." The second address mapping information may include a second logical address "1" corresponding to a second address ADDR2 and a second physical address "1000" corresponding to the second logical address "1." The first physical address "0" may correspond to the first page PGB1 in the first storage area 220a, and the second physical address "1000" may correspond to the second page PGS1 in the second storage area 230a.

The first physical address "0" may be within a first range, and the second physical address "1000" may be within a second range that is different from the first range. The first range and the second range may be a consecutive range of addresses. In other words, an end physical address in the first range and a beginning physical address in the second range may be two consecutive numbers. For example, the first range may be from 0 to 999, and the second range may be from 1000 to 9999.

In the method of mapping the address in the storage device described based on FIG. 6, the first and second storage areas 220a and 230a may be identified based on the range of the physical address. As will be described below with reference to FIGS. 11 and 13, when a data read operation is performed, it may be determined whether read data is stored in the first storage area or the second storage area based on a range of a physical address corresponding to a read address, and then the read data may be output based on the determination result. As will be described below with reference to FIGS. 14 and 16, when a data write operation is performed, a physical address included in one of the first and second ranges may be obtained based on whether write data is stored in the first storage area or the second storage area, and then the address mapping table may be updated by registering a write address and the physical address corresponding to the write address.

Although FIG. 6 illustrates that the first range and the second range are a consecutive range of addresses, the first range and the second range may not be a consecutive range of addresses according to example embodiments. For example, the first range may be from 0 to 500, and the second range may be from 1000 to 5000. In addition, although FIG. 6 illustrates that the storage areas are identified based on the range of the physical address, the storage areas may be identified based on the range of the logical address according to example embodiments.

Figure 7:
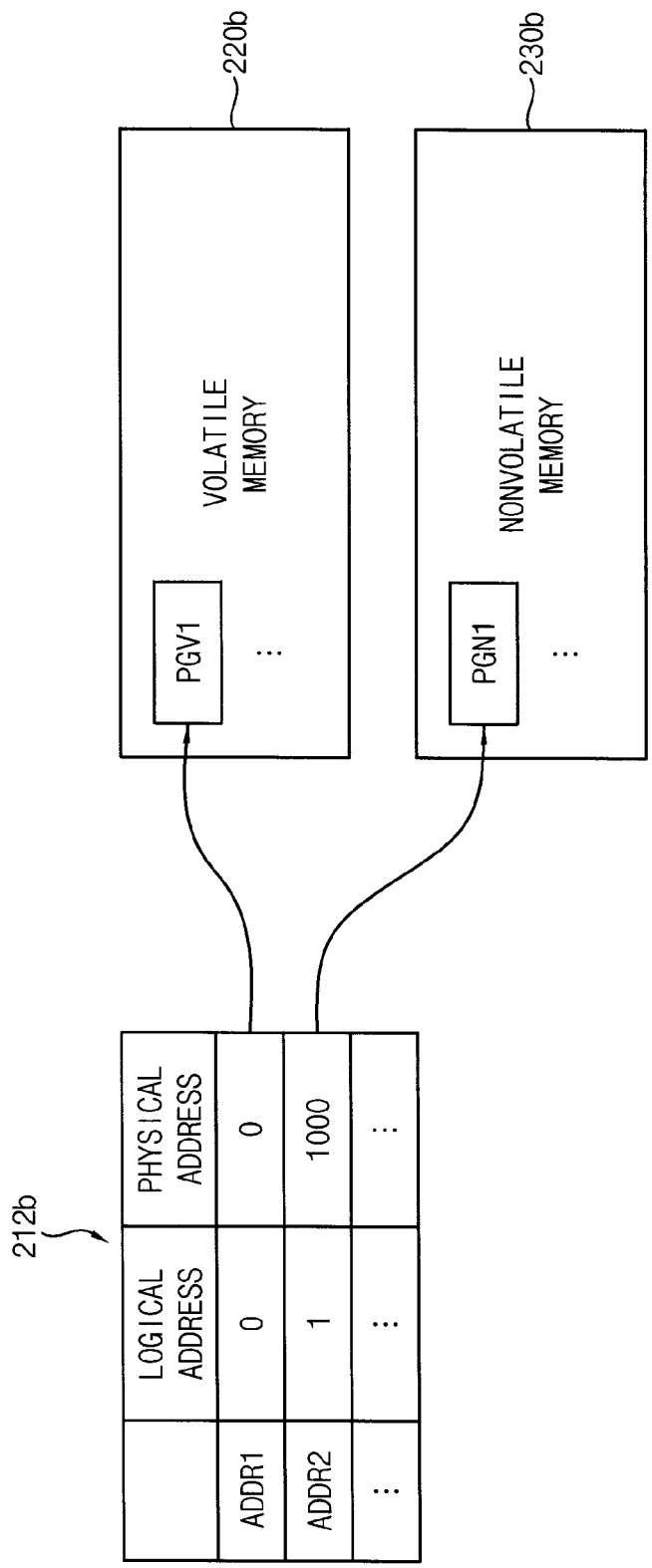

Referring to FIG. 7, a first storage area 220b and a second storage area 230b in FIG. 7 may be substantially the same as the first storage area 220b and the second storage area 230b in FIG. 4, respectively.

An address mapping table 212b in FIG. 7 may be substantially the same as the address mapping table 212b in FIG. 6. In other words, the address mapping table 212b in FIG. 7 may include first address mapping information and second address mapping information. The first address mapping information may include a first logical address "0" corresponding to a first address ADDR1 and a first physical address "0" corresponding to the first logical address "0." The second address mapping information may include a second logical address "1" corresponding to a second address ADDR2 and a second physical address "1000" corresponding to the second logical address "1." The first physical address "0" may correspond to the first page PGV1 in the first storage area 220b, and the second physical address "1000" may correspond to the second page PGN1 in the second storage area 230b.

The first physical address "0" may be within a first range (e.g., from 0 to 999) that identifies the first storage area 220b, and the second physical address "1000" may be within a second range (e.g., from 1000 to 9999) that identifies the second storage area 230b.

In the method of mapping the address in the storage device described based on FIG. 7, the first and second storage areas 220b and 230b may be identified based on the range of the physical address. In addition, a data read operation and/or a data write operation may be performed based on the range of the physical address and the address mapping table.

Figure 8:
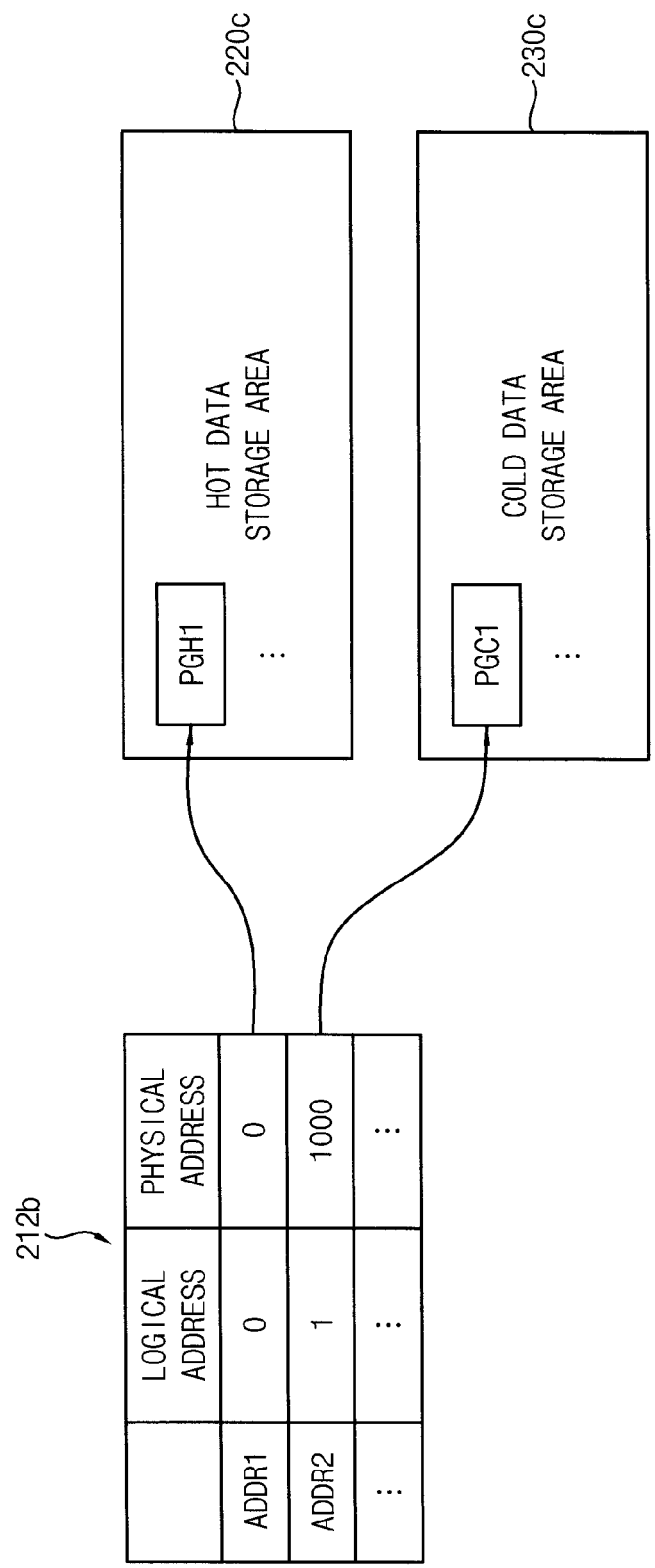

Referring to FIG. 8, a first storage area 220c and a second storage area 230c in FIG. 8 may be substantially the same as the first storage area 220c and the second storage area 230c in FIG. 5, respectively.

An address mapping table 212b in FIG. 8 may be substantially the same as the address mapping table 212b in FIG. 6. In other words, the address mapping table 212b in FIG. 8 may include first address mapping information and second address mapping information. The first address mapping information may include a first logical address "0" corresponding to a first address ADDR1 and a first physical address "0" corresponding to the first logical address "0." The second address mapping information may include a second logical address "1" corresponding to a second address ADDR2 and a second physical address "1000" corresponding to the second logical address "1." The first physical address "0" may correspond to the first page PGH1 in the first storage area 220c, and the second physical address "1000" may correspond to the second page PGC1 in the second storage area 230c.

The first physical address "0" may be within a first range (e.g., from 0 to 999) that identifies the first storage area 220c, and the second physical address "1000" may be within a second range (e.g., from 1000 to 9999) that identifies the second storage area 230c.

In the method of mapping the address in the storage device described based on FIG. 8, the first and second storage areas 220c and 230c may be identified based on the range of the physical address. In addition, a data read operation and/or a data write operation may be performed based on the range of the physical address and the address mapping table.

Figure 9:
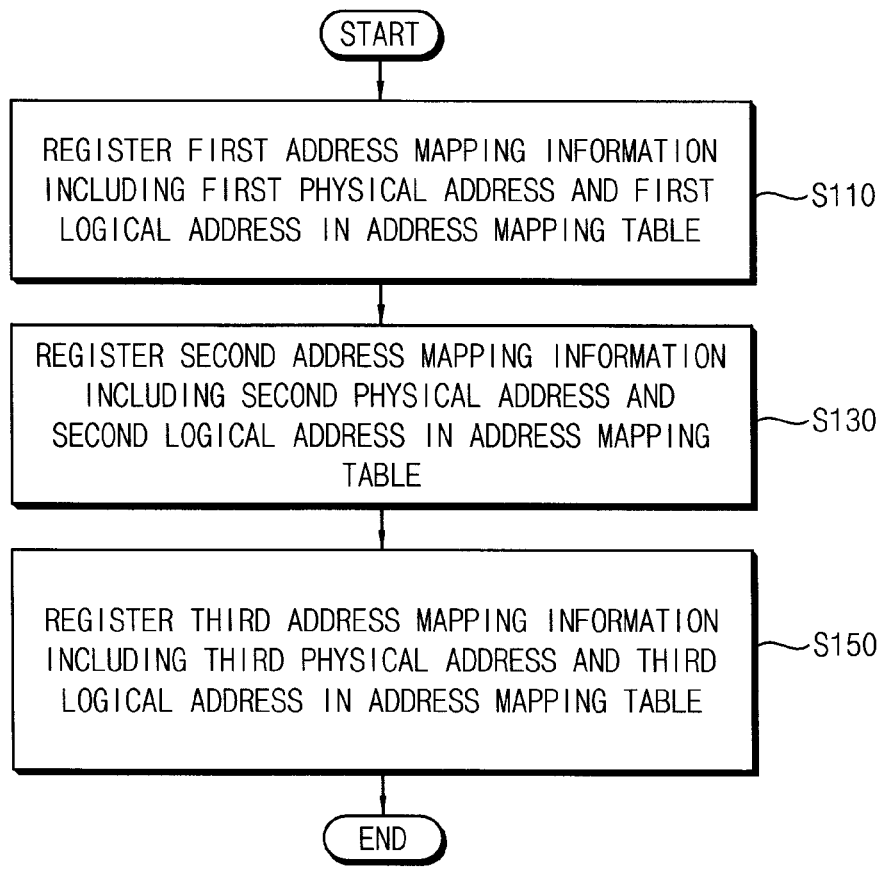
FIG. 9 is a flow chart illustrating a method of mapping addresses in a storage device according to example embodiments of the inventive concept.

FIG. 9 is a flow chart illustrating a method of mapping addresses in a storage device according to example embodiments of the inventive concept.

Referring to FIG. 9, in the method of mapping the address in the storage device according to example embodiments, first address mapping information is registered in an address mapping table (step S110), second address mapping information is registered in the address mapping table (step S130) and third address mapping information is registered in the address mapping table (step S150). The storage device includes a first storage area, a second storage area and a third storage area. The first address mapping information includes a first physical address and a first logical address. The first physical address corresponds to the first storage area including a first type of memory. The first logical address corresponds to the first physical address. The second address mapping information includes a second physical address and a second logical address. The second physical address corresponds to the second storage area including a second type of memory, which is different from the first type of memory. The second logical address corresponds to the second physical address. The third address mapping information includes a third physical address and a third logical address. The third physical address corresponds to the third storage area including a third type of memory, which is different from the first and second types of memories. The third logical address corresponds to the third physical address.

In the method of mapping the address in the storage device according to example embodiments, the address mapping information associated with the first, second and third storage areas in the storage device is registered in a single address mapping table, and addresses for accessing the first, second and third storage areas in the storage device may be synthetically mapped in the single address mapping table. Accordingly, in the storage device using the method of FIG. 9, overhead and latencies required to access the memories in the storage device may be reduced, and thus the storage device may have relatively improved performance.

Figure 10:
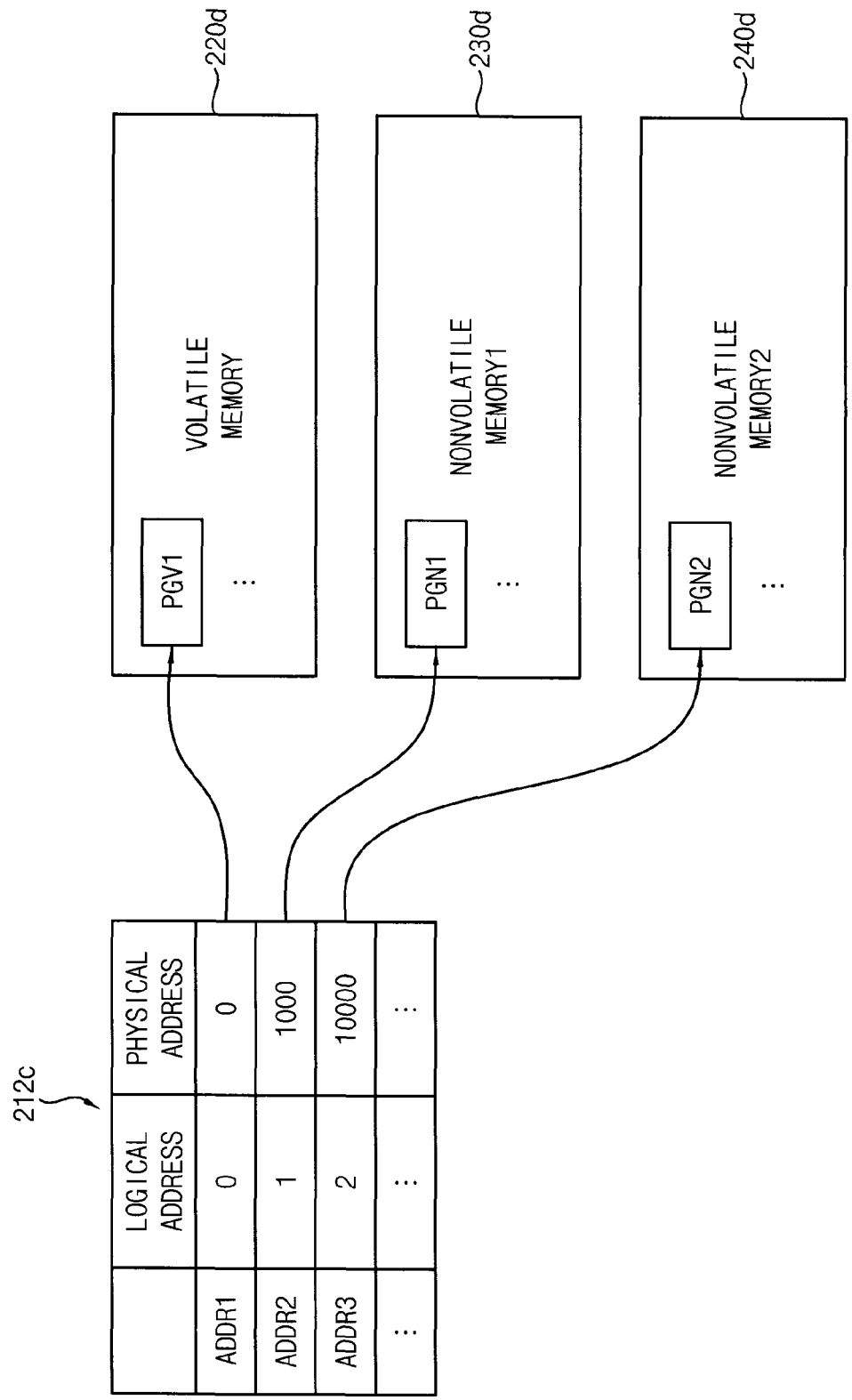
FIG. 10 is a diagram descriptive of the method of mapping addresses shown in FIG. 9.

FIG. 10 is a diagram descriptive of the method of mapping addresses shown in FIG. 9.

Referring to FIG. 10, a first storage area 220d may include at least one volatile memory such as a DRAM, an SRAM, etc. A second storage area 230d may include at least one first nonvolatile memory that has a relatively high operation speed, such as a PRAM, an MRAM, etc. A third storage area 240d may include at least one second nonvolatile memory that has a relatively low operation speed, such as a flash memory. The first storage area 220d may include a plurality of pages having a first page PGV1, the second storage area 230d may include a plurality of pages having a second page PGN1 and the third storage area 240d may include a plurality of pages having a third page PGN2. Configurations of the first, second and third storage areas 220d, 230d and 240d may be changed according to example embodiments.

An address mapping information that includes a plurality of logical addresses and a plurality of physical addresses may be included in an address mapping table 212c. For example, the address mapping table 212c may include first address mapping information, second address mapping information and third address mapping information. The first address mapping information may include a first logical address "0" corresponding to a first address ADDR1 and a first physical address "0" corresponding to the first logical address "0." The second address mapping information may include a second logical address "1" corresponding to a second address ADDR2 and a second physical address "1000" corresponding to the second logical address "1." The third address mapping information may include a third logical address "2" corresponding to a third address ADDR3 and a third physical address "10000" corresponding to the third logical address "2." The first physical address "0" may correspond to the first page PGV1 in the first storage area 220d, the second physical address "1000" may correspond to the second page PGN1 in the second storage area 230d, and the third physical address "10000" may correspond to the third page PGN2 in the third storage area 240d.

The first physical address "0" may be within a first range, the second physical address "1000" may be within a second range that is different from the first range, and the third physical address "10000" may be within a third range that is different from the first and second ranges. For example, the first range may be from 0 to 999, the second range may be from 1000 to 9999, and the third range may be from 10000 to 99999.

In the method of mapping the address in the storage device described based on FIG. 10, the first, second and third storage areas 220d, 230d and 240d may be identified based on the range of the physical address.

Although not illustrated in FIG. 10, the storage areas may be identified based on the range of the logical addresses according to example embodiments. In addition, although not illustrated in FIG. 10, the storage areas may be identified based on a flag bit, as described above with reference to FIGS. 3, 4 and 5. The flag bit may be included in one of the physical address and the logical address.

Figure 11:
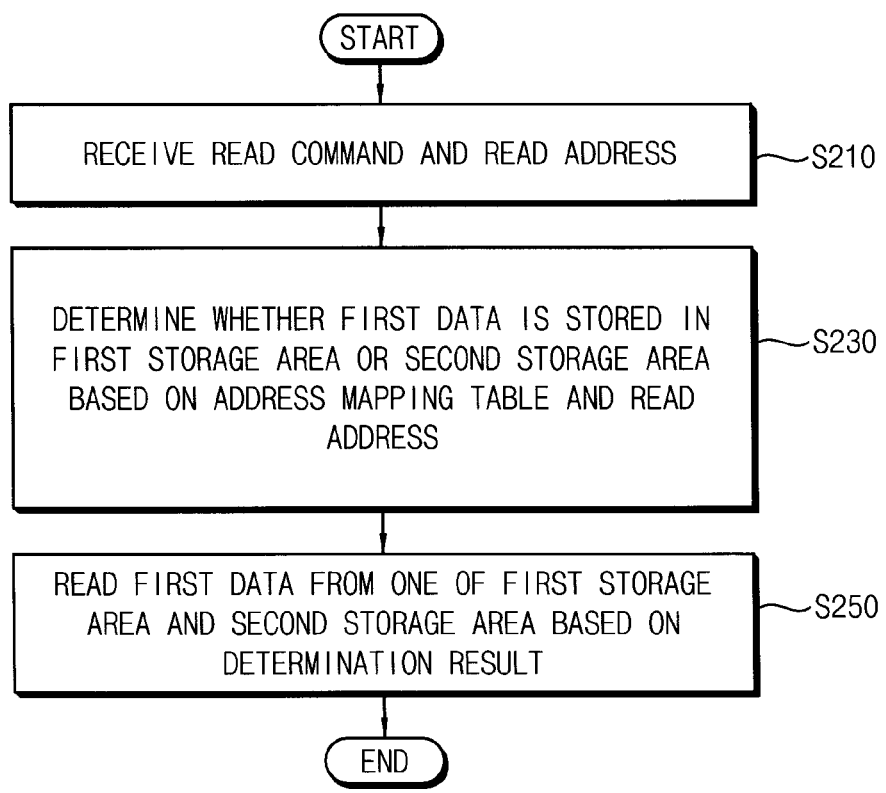
FIG. 11 is a flow chart illustrating a method of reading data from a storage device according to example embodiments of the inventive concept.

FIG. 11 is a flow chart illustrating a method of reading data from a storage device according to example embodiments of the inventive concept.

The method of FIG. 11 may be applied for driving a storage device that includes at least two storage areas. The at least two storage areas may include different types of memories.

Referring to FIG. 11, in the method of reading the data from the storage device according to example embodiments, a read command and a read address are received from an external host (step S210). It is determined whether first data is stored in a first storage area or a second storage area based on an address mapping table and the read address to generate a determination result (step S230). The first data may represent data to be read based on a request from the external host. The first data is read from one of the first storage area and the second storage area based on the determination result (step S250).

The storage device includes the first storage area and the second storage area. The address mapping table includes an address mapping information associated with the first storage area and the second storage area. For example, the address mapping table may include first address mapping information and second address mapping information. The first address mapping information may include a first physical address and a first logical address. The first physical address may correspond to the first storage area including a first type of memory. The first logical address may correspond to the first physical address. The second address mapping information may include a second physical address and a second logical address. The second physical address may correspond to the second storage area including a second type of memory, which is different from the first type of memory. The second logical address may correspond to the second physical address. The address mapping table may be generated based on the method of FIG. 1 and the examples illustrated in FIGS. 3, 4, 5, 6, 7 and 8.

In the method of reading the data from the storage device according to example embodiments, the first and second storage areas in the storage device may be accessed based on a single address mapping table. Accordingly, in the storage device using the method of FIG. 11, overhead and latencies required to access a storage area having read data may be reduced, and thus the storage device may have relatively improved read performance.

Figure 12:
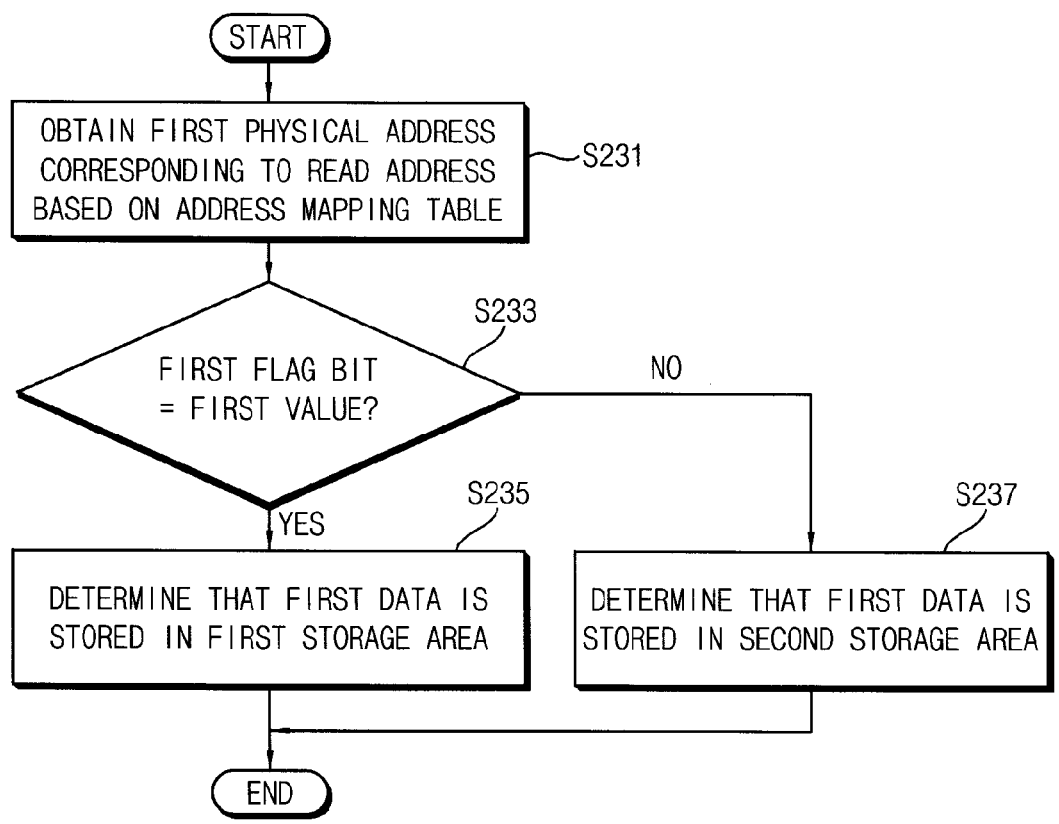
FIG. 12 is a flow chart illustrating an example of step S230 shown in FIG. 11.

FIG. 12 is a flow chart illustrating an example of step S230 shown in FIG. 11.

Referring to FIGS. 11 and 12, in the step S230, a first physical address corresponding to the read address may be obtained based on the address mapping table (step S231). For example, the read address may be a first logical address, and the first physical address corresponding to the first logical address may be obtained based on the address mapping information included in the address mapping table.

A region (e.g., a page) in which the first data is stored may be determined based on a first flag bit included in the first physical address (step S233). As described above with reference to FIGS. 3, 4 and 5, the storage areas included in the storage device may be identified based on a flag bit included in a physical address. For example, the first flag bit may be any one bit (e.g., an MSB) of the first physical address.

When the first flag bit has a first value (step S233: YES), it is determined that the first data is stored in the first storage area (step S235). In this case, the first data may be read from the first storage area in the step S250 in FIG. 11. For example, the first value may be "0."

When the first flag bit has a second value that is different from the first value (step S233: NO), it is determined that the first data is stored in the second storage area (step S237). In this case, the first data may be read from the second storage area in the step S250 in FIG. 11. For example, the second value may be "1."

According to example embodiments, the flag bit may be included in a logical address. According to example embodiments, the storage device may include three storage areas having different types of memories, as described above with reference to FIGS. 9 and 10, or may include more than three storage areas. The method of FIG. 11 and the example illustrated in FIG. 12 may be changed to be applicable to the storage device including three storage areas or more than three storage areas.

Figure 13:
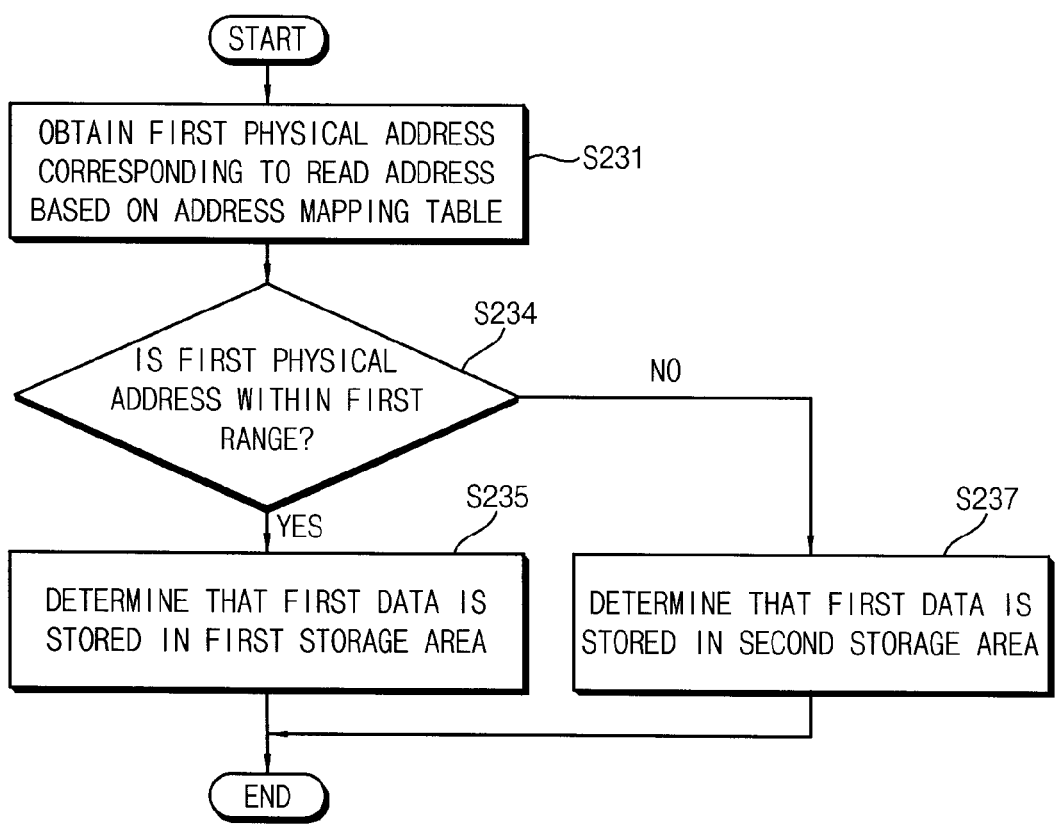
FIG. 13 is a flow chart illustrating another example of step S230 shown in FIG. 11.

FIG. 13 is a flow chart illustrating another example of step S230 shown in FIG. 11.

Referring to FIGS. 11 and 13, in the step S230, a first physical address corresponding to the read address may be obtained based on the address mapping table (step S231). The step S231 in FIG. 13 may be substantially the same as the step S231 in FIG. 12. For example, the read address may be a first logical address, and the first physical address corresponding to the first logical address may be obtained based on the address mapping information included in the address mapping table.

A region (e.g., a page) in which the first data is stored may be determined based on a range of the first physical address (step S234). As described above with reference to FIGS. 6, 7 and 8, the first physical address may be within one of a first range and a second range that are a consecutive range of addresses. For example, the first range may be from 0 to 999, and the second range may be from 1000 to 9999.

When the first physical address is within the first range (step S234: YES), it is determined that the first data is stored in the first storage area (step S235). When the first physical address is within the second range that is different from the first range (step S234: NO), it is determined that the first data is stored in the second storage area (step S237). The steps S235 and S237 in FIG. 13 may be substantially the same as the steps S235 and S237 in FIG. 12, respectively.

According to example embodiments, the region in which the first data is stored may be determined based on a range of the first logical address. According to example embodiments, the storage device may include three storage areas having different types of memories, as described above with reference to FIGS. 9 and 10, or may include more than three storage areas. The method of FIG. 11 and the example illustrated in FIG. 13 may be changed to be applicable to the storage device including three storage areas or more than three storage areas.

Figure 14:
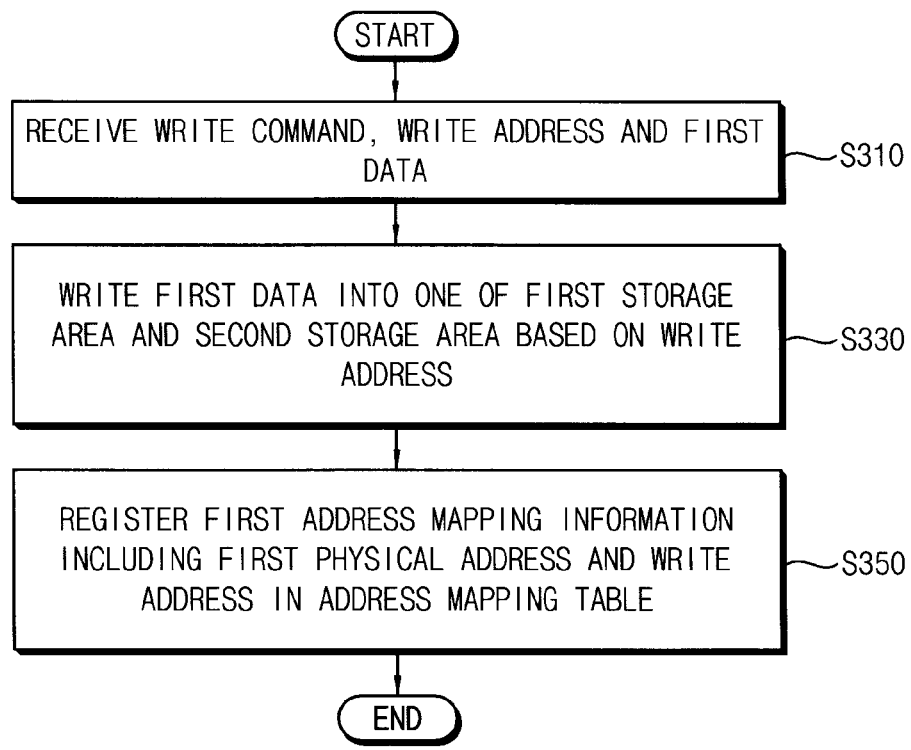
FIG. 14 is a flow chart illustrating a method of writing data into a storage device according to example embodiments of the inventive concept.

FIG. 14 is a flow chart illustrating a method of writing data into a storage device according to example embodiments of the inventive concept.

The method of FIG. 14 may be applied for driving a storage device that includes at least two storage areas. The at least two storage areas may include different types of memories.

Referring to FIG. 14, in the method of writing the data into the storage device according to example embodiments, a write command, a write address and first data are received from an external host (step S310). The first data is written into one of a first storage area and a second storage area based on the write address (step S330). The first data may represent data to be written based on a request from the external host. First address mapping information is registered in an address mapping table (step S350).

The storage device includes the first storage area and the second storage area. The first storage area includes a first type of memory, and the second storage area includes a second type of memory, which is different from the first type of memory. The address mapping table includes an address mapping information associated with the first storage area and the second storage area. The first address mapping information includes a first physical address and the write address. The first physical address corresponds to a region in which the first data is stored. For example, the write address may be a first logical address, and the first logical address may correspond to the first physical address. The address mapping table may be generated based on the method of FIG. 1 and the examples illustrated in FIGS. 3, 4, 5, 6, 7 and 8.

In the method of writing the data into the storage device according to example embodiments, information for accessing the first and second storage areas in the storage device may be registered in a single address mapping table after the data is stored in the storage device. Accordingly, in the storage device using the method of FIG. 14, overhead and latencies required to access the storage areas may be reduced, and thus the storage device may have relatively improved performance.

Figure 15:
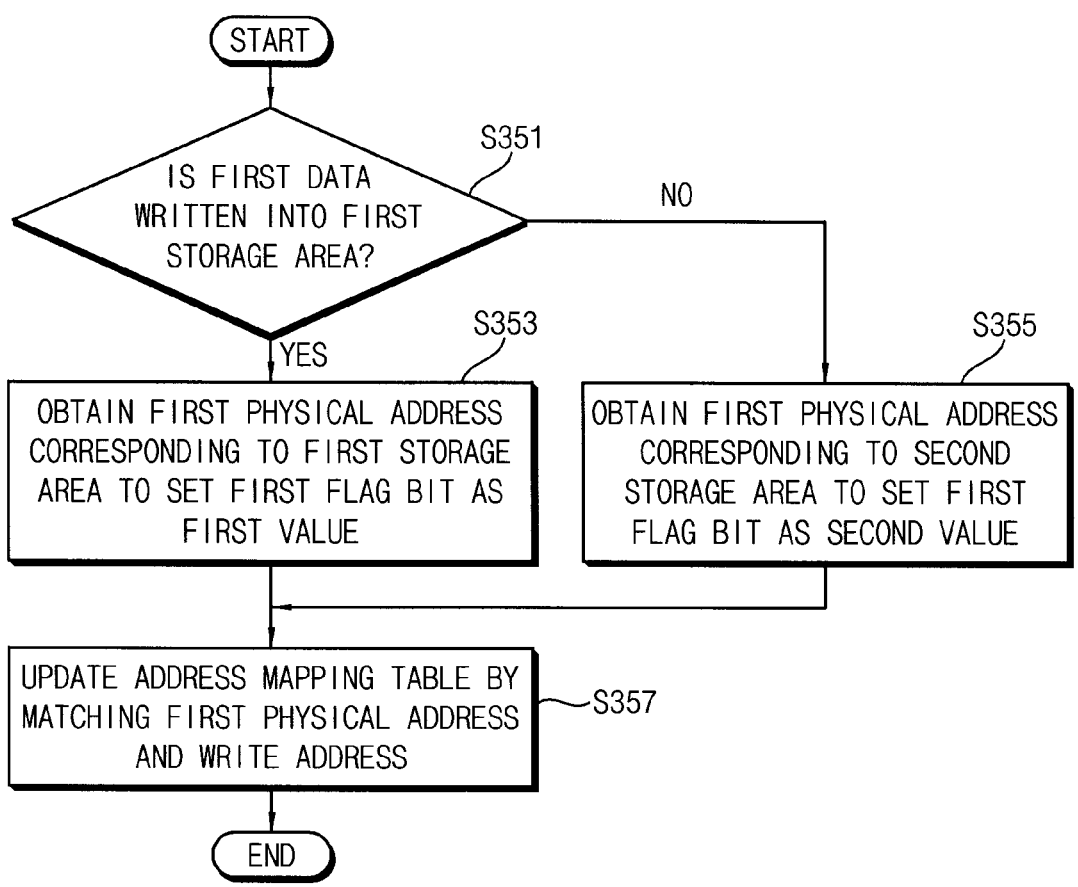
FIG. 15 is a flow chart illustrating an example of step S350 shown in FIG. 14.

FIG. 15 is a flow chart illustrating an example of step S350 shown in FIG. 14.

Referring to FIGS. 14 and 15, in the step S350, it may be determined whether the first data is written into a region (e.g., a page) in the first storage area or a region (e.g., a page) in the second storage area (step S351).

When the first data is written into the first storage area (step S351: YES), the first physical address corresponding to the first storage area may be obtained to set a first flag bit included in the first physical address as a first value (step S353). When the first data is written into the second storage area (step S351: NO), the first physical address corresponding to the second storage area may be obtained to set the first flag bit as a second value that is different from the first value (step S355). As described above with reference to FIGS. 3, 4 and 5, the storage areas included in the storage device may be identified based on a flag bit included in a physical address. For example, the first flag bit may be any one bit (e.g., an MSB) of the first physical address.

The address mapping table may be updated by matching the first physical address and the write address (step S357). Since the write address is the first logical address, the first logical address, the first physical address and the first flag bit set by the step S353 or the step S355 may be registered in the updated address mapping table. In other words, the first address mapping information may include the first logical address, the first physical address and the first flag bit.

According to example embodiments, the flag bit may be included in a logical address. According to example embodiments, the storage device may include three storage areas having different types of memories, as described above with reference to FIGS. 9 and 10, or may include more than three storage areas. The method of FIG. 14 and the example illustrated in FIG. 15 may be changed to be applicable to the storage device including three storage areas or more than three storage areas.

Figure 16:
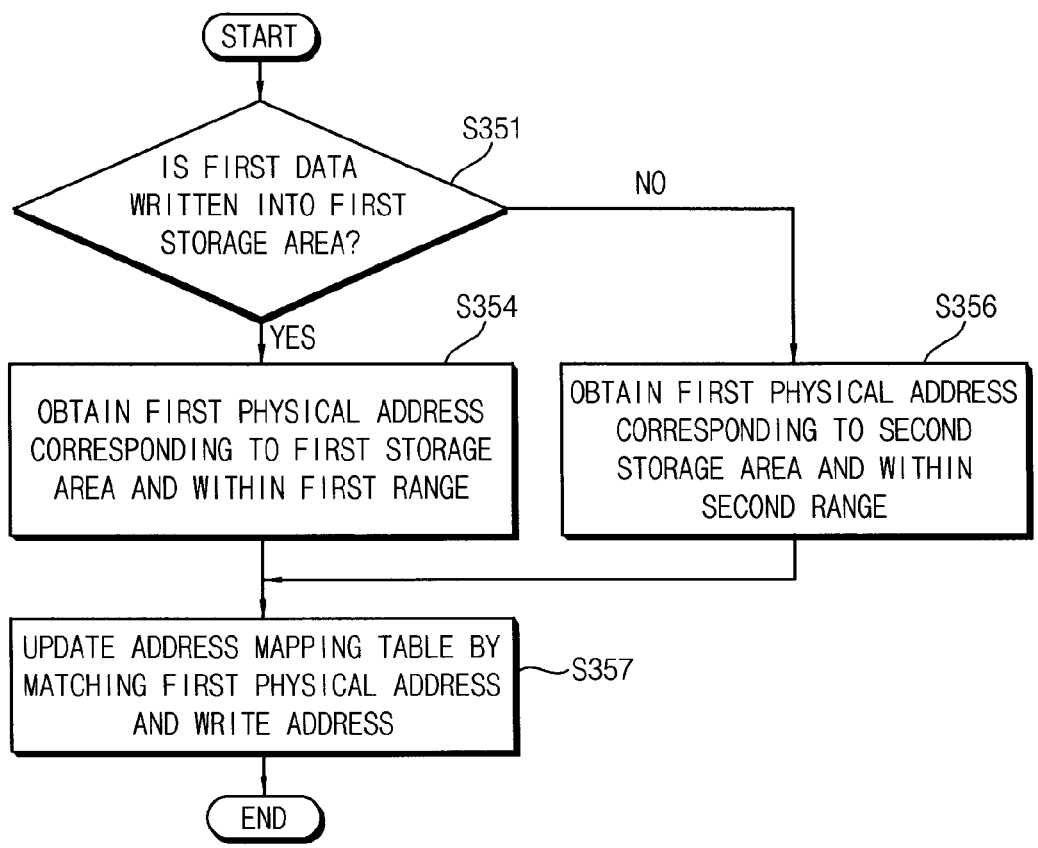
FIG. 16 is a flow chart illustrating another example of step S350 shown in FIG. 14.

FIG. 16 is a flow chart illustrating another example of step S350 shown in FIG. 14.

Referring to FIGS. 14 and 16, in the step S350, it may be determined whether the first data is written into a region (e.g., a page) in the first storage area or a region (e.g., a page) in the second storage area (step S351). The step S351 in FIG. 16 may be substantially the same as the step S351 in FIG. 15.

When the first data is written into the first storage area (step S351: YES), the first physical address corresponding to the first storage area and within a first range may be obtained (step S354). When the first data is written into the second storage area (step S351: NO), the first physical address corresponding to the second storage area and within a second range that is different from the first range may be obtained (step S356). As described above with reference to FIGS. 6, 7 and 8, the first physical address may be within one of the first range and the second range that are a consecutive range of addresses.

The address mapping table may be updated by matching the first physical address and the write address (step S357). The step S357 in FIG. 16 may be substantially the same as the step S357 in FIG. 15.

According to example embodiments, the region in which the first data is written may be determined based on a range of the first logical address corresponding to the write address. According to example embodiments, the storage device may include three storage areas having different types of memories, as described above with reference to FIGS. 9 and 10, or may include more than three storage areas. The method of FIG. 14 and the example illustrated in FIG. 16 may be changed to be applicable to the storage device including three storage areas or more than three storage areas.

FIG. 17 is a diagram illustrating a memory card (MC) according to example embodiments of the inventive concept.

Referring to FIG. 17, a memory card 900 may include a plurality of connecting pins 910, a memory controller 920, a volatile memory device 930 and a plurality of nonvolatile memory devices 940.

The connecting pins 910 may be coupled to a host (not illustrated) to transfer signals between the host and the memory card 900. The connecting pins 910 may include a clock pin, a command pin, a data pin and/or a reset pin.

The memory controller 920 may receive data from the host, and may store the received data in the plurality of nonvolatile memory devices 940. The volatile memory device 930 may temporarily store data transferred between the host and the plurality of nonvolatile memory devices 940.

The memory card 900 may operate based on the method of mapping the address described above with reference to FIGS. 1 through 10, the method of reading the data described above with reference to FIGS. 11 through 13, and/or the method of writing the data described above with reference to FIGS. 14 through 16. For example, addresses for accessing different types of memories in the memory card 900 may be synthetically mapped in a single address mapping table, and a data read operation and/or a data write operation may be performed based on the single address mapping table. Accordingly, overhead and latencies required to access the memory card 900 may be reduced, and thus the memory card 900 may have relatively improved performance.

Although FIG. 17 illustrates that the memory card 900 includes the volatile memory device 930 and the plurality of nonvolatile memory devices 940, memory cards operating the methods according to example embodiments may include at least two storage areas having different types of memories.

For example, the memory card 900 may include a multimedia card (MMC), an embedded multimedia card (eMMC), a hybrid embedded multimedia card (hybrid eMMC), a secure digital (SD) card, a micro-SD card, a memory stick, an identification (ID) card, a personal computer memory card international association (PCMCIA) card, a chip card, a USB card, a smart card, a compact flash (CF) card, and so on.

In some example embodiments, the memory card 900 may be attachable to the host, such as a desktop computer, a laptop computer, a tablet computer, a mobile phone, a smart phone, a music player, a personal digital assistants (PDA), a portable multimedia player (PMP), a digital television, a digital camera, a portable game console, etc.

FIG. 18 is a diagram illustrating a solid state drive (SSD) according to example embodiments of the inventive concept.

Referring to FIG. 18, a solid state drive 1000 includes a memory controller 1010, a volatile memory device 1020 and a plurality of nonvolatile memory devices 1030.

The memory controller 1010 may receive data from a host (not illustrated). The memory controller 1010 may store the received data in the plurality of nonvolatile memory devices 1030. The volatile memory device 1020 may temporarily store data transferred between the host and the plurality of nonvolatile memory devices 1030, and may be implemented outside the memory controller 1010.

The solid state drive 1000 may operate based on the method of mapping the address described above with reference to FIGS. 1 through 10, the method of reading the data described above with reference to FIGS. 11 through 13, and/or the method of writing the data described above with reference to FIGS. 14 through 16. For example, addresses for accessing different types of memories in the solid state drive 1000 may be synthetically mapped in a single address mapping table, and a data read operation and/or a data write operation may be performed based on the single address mapping table. Accordingly, overhead and latencies required to access the solid state drive 1000 may be reduced, and thus the solid state drive 1000 may have relatively improved performance.

In some example embodiments, the method of mapping the address, reading the data or the writing the data is applied between the volatile memory device 1020 and the plurality of nonvolatile memory devices 1030. Thus, the volatile memory device 1020 may store hot data where a frequency of access to the hot data is higher than or equal to a reference frequency. The plurality of nonvolatile memory devices 1030 may store cold data where a frequency of access to the cold data is lower than the reference frequency.

In other example embodiments, the method of mapping the address, reading the data or the writing the data is applied between the plurality of nonvolatile memory devices 1030. Thus, some of the plurality of nonvolatile memory devices 1030 may store hot data where a frequency of access to the hot data is higher than or equal to a reference frequency. Other nonvolatile memory devices among the plurality of nonvolatile memory devices 1030 may store cold data where a frequency of access to the cold data is lower than the reference frequency.

In some example embodiments, the volatile memory device 1020 may include single level memory cells, and the plurality of nonvolatile memory devices 1030 may include multi-level memory cells.

In other example embodiments, some of the plurality of nonvolatile memory devices 1030 may include single level memory cells, and other nonvolatile memory devices among the plurality of nonvolatile memory devices 1030 may include multi-level memory cells.

Although FIG. 18 illustrates that the solid state drive 1000 includes the volatile memory device 1020 and the plurality of nonvolatile memory devices 1030, solid state drives operating the methods according to example embodiments may include at least two storage areas having different types of memories.

In some example embodiments, the solid state drive 1000 may be coupled to the host, such as a mobile device, a mobile phone, a smart phone, a PDA, a PMP, a digital camera, a portable game console, a music player, a desktop computer, a notebook computer, a tablet computer, a speaker, a video, a digital television, and so on.

Figure 19:
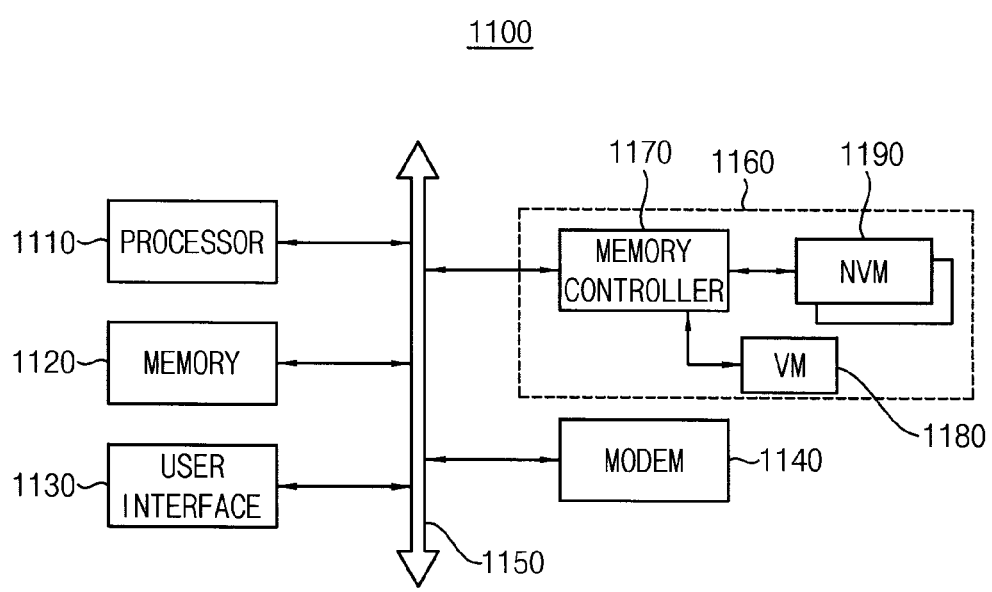
FIG. 19 is a diagram illustrating a computing system according to example embodiments of the inventive concept.

FIG. 19 is a diagram illustrating a computing system according to example embodiments of the inventive concept.

Referring to FIG. 19, a computing system 1100 includes a processor 1110, a memory device 1120, a user interface 1130, a bus 1150 and a storage device 1160. In some example embodiments, the computing system 1100 may further include a modem 1140, such as a baseband chipset.

The processor 1110 may perform specific calculations or tasks. For example, the processor 1110 may be a microprocessor, a central processing unit (CPU), a digital signal processor, or the like. The processor 1110 may be coupled to the memory device 1120 via a bus 1150, such as an address bus, a control bus and/or a data bus. For example, the memory device 1120 may be implemented by a DRAM, a mobile DRAM, an SRAM, a PRAM, an FRAM, a RRAM, an MRAM and/or a flash memory. Further, the processor 1110 may be coupled to an extension bus, such as a peripheral component interconnect (PCI) bus, and may control the user interface 1130 including at least one input device, such as a keyboard, a mouse, a touch screen, etc., and at least one output device, such as a printer, a display device, etc. The modem 1140 may perform wired or wireless communication with an external device.

A volatile memory device 1180 and a plurality of nonvolatile memory devices 1190 in the storage device 1160 may be controlled by a memory controller 1170 to store data processed by the processor 1110 or data received via the modem 1140. The storage device 1160 may operate based on the method of mapping the address described above with reference to FIGS. 1 through 10, the method of reading the data described above with reference to FIGS. 11 through 13, and/or the method of writing the data described above with reference to FIGS. 14 through 16. Accordingly, overhead and latencies required to access the storage device 1160 may be reduced, and thus the storage device 1160 may have relatively improved performance.

In some example embodiments, the computing system 1100 may further include a power supply, an application chipset, a camera image processor (CIS), etc.

The above described embodiments may be applied to any storage device and an electronic system including the storage device. For example, the above described embodiments may be applied to various electronic systems, e.g., a memory card, a solid state drive, an embedded multimedia card (eMMC), a universal flash storage, a hybrid universal flash storage, a computer, a digital camera, a three dimensional (3D) camera, a cellular phone, a PDA, a scanner, a navigation system, and so on.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concept. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of mapping addresses in a storage device, the method comprising:
   registering first address mapping information including a first physical address and a first logical address in an address mapping table, the first physical address corresponding to a first storage area in the storage device, the first storage area including a first type of memory, the first logical address corresponding to the first physical address; and
   registering second address mapping information including a second physical address and a second logical address in the address mapping table, the second physical address corresponding to a second storage area in the storage device, the second storage area including a second type of memory that is different from the first type of memory, the second logical address corresponding to the second physical address,
   wherein the first storage area is configured to store first data, a number of times the first data is accessed being higher than or equal to a reference value, and
   the second storage area is configured to store second data, a number of times the second data is accessed being lower than the reference value.

2. The method of claim 1, wherein the first physical address includes a first flag bit, the second physical address includes a second flag bit, and the first flag bit in the first physical address has a different value than the second flag bit in the second physical address.

3. The method of claim 2, wherein the first flag bit in the first physical address corresponds to a most significant bit (MSB) of the first physical address.

4. The method of claim 1, wherein the first physical address is within a first range, and the second physical address is within a second range that is different from the first range.

5. The method of claim 4, wherein the first range and the second range are a consecutive range of addresses.

6. The method of claim 1, wherein the first storage area includes at least one volatile memory, and the second storage area includes at least one nonvolatile memory.

7. The method of claim 6, wherein the storage device includes a battery configured to supply power to the storage device.

8. The method of claim 1, wherein the first data includes at least one of meta data, a file allocation table (FAT) and a directory entry (DE).

9. The method of claim 1, further comprising:
registering third address mapping information including a third physical address and a third logical address in the address mapping table, the third physical address corresponding to a third storage area in the storage device, the third storage area including a third type of memory different from the first and second types of memories, the third logical address corresponding to the third physical address.

10. The method of claim 1, wherein the storage device includes a controller configured to receive a command from an external host, the controller being configured to control an operation of the storage device based on the command.

11. The method of claim 10, wherein the address mapping table is stored in at least one of the first storage area and the second storage area, and the address mapping table is used in the storage device by loading the address mapping table on the controller.

12. A storage device comprising:
a first storage area configured to store first data, a number of times the first data is accessed being higher than or equal to a reference value;
a second storage area configured to store second data, a number of times the second data is accessed being lower than the reference value; and
a controller configured to receive a command from an external host, and to control an operation of the storage device based on the command,
wherein the first storage area includes a first type of memory device,
the second storage area includes a second type of memory device that is different from the first type of memory device, and
the controller is configured to store the first data in the first storage area based on first address mapping information associated with the first storage area and to store the second data in the second storage area based on second address mapping information associated with the second storage area.

13. The storage device of claim 12, wherein the controller comprises a processor, a host interface, a memory interface, an error correction code (ECC) block and a bus.

14. The storage device of claim 12, wherein the first storage area includes a volatile memory device, and the second storage area includes a nonvolatile memory device.

15. The storage device of claim 12, wherein an address mapping table is stored either in the first storage area or in the second storage area, the address mapping table including the first address mapping information and the second address mapping information.

16. The storage device of claim 15, wherein the first address mapping information includes a first physical address and a first logical address, the first physical address corresponding to the first storage area, the first logical address corresponding to the first physical address, and
the second address mapping information includes a second physical address and a second logical address, the second physical address corresponding to the second storage area, the second logical address corresponding to the second physical address.

17. A solid state drive (SSD) comprising:
a volatile memory device configured to temporarily store data transferred from a host, the data including a first data and a second data;
a plurality of nonvolatile memory devices including a first nonvolatile memory device and a second nonvolatile memory device; and
a controller configured to receive the data from the host and to store the received data in one of the plurality of nonvolatile memory devices,
wherein the first nonvolatile memory device is configured to store the first data, a number of times the first data is accessed being higher than or equal to a reference value,
the second nonvolatile memory device is configured to store the second data, a number of times the second data is accessed being lower than the reference value, and
the controller is configured to store the first data in the first nonvolatile memory device based on first address mapping information associated with the first nonvolatile memory device and to store the second data in the second nonvolatile memory device based on second address mapping information associated with the second nonvolatile memory device.

18. The SSD of claim 17, wherein an address mapping table is stored either in the volatile memory device or in one of the plurality of nonvolatile memory devices, the address mapping table including the first address mapping information and the second address mapping information,
the first address mapping information includes a first physical address and a first logical address, the first physical address corresponding to the first nonvolatile memory device, the first logical address corresponding to the first physical address, and
the second address mapping information includes a second physical address and a second logical address, the second physical address corresponding to the second nonvolatile memory device, the second logical address corresponding to the second physical address.

19. The SSD of claim 17, wherein the plurality of nonvolatile memory devices include a flash memory.

20. The SSD of claim 17, wherein the first nonvolatile memory device includes single level memory cells, and the second nonvolatile memory device includes multi-level memory cells.

* * * * *